United States Patent
Murakami et al.

(10) Patent No.: US 7,742,186 B2
(45) Date of Patent: Jun. 22, 2010

(54) IMAGE FORMING APPARATUS, IMAGE PROCESSING SYSTEM, METHOD FOR EXPANDING FUNCTION OF IMAGE FORMING APPARATUS AND METHOD FOR FORMING VIRTUAL NETWORK

(75) Inventors: Masakazu Murakami, Itami (JP); Yoichi Kawabuchi, Itami (JP); Yoshikazu Ikenoue, Itami (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1092 days.

(21) Appl. No.: 11/366,586

(22) Filed: Mar. 3, 2006

(65) Prior Publication Data

US 2007/0041043 A1    Feb. 22, 2007

(30) Foreign Application Priority Data

Aug. 17, 2005  (JP) .............................. 2005-236931

(51) Int. Cl.
G06F 15/00 (2006.01)
G06F 3/12 (2006.01)
G06K 1/00 (2006.01)
(52) U.S. Cl. ..................................... 358/1.15; 358/1.13
(58) Field of Classification Search ....... 358/1.12–1.18; 709/217; 710/714
See application file for complete search history.

(56) References Cited

U.S. PATENT DOCUMENTS

| | | | |
|---|---|---|---|
| 5,946,458 A | 8/1999 | Austin et al. | |
| 5,960,167 A | 9/1999 | Roberts et al. | |
| 6,026,258 A | 2/2000 | Fresk et al. | |
| 6,839,755 B1 | 1/2005 | Kumpf | |
| 2004/0267904 A1* | 12/2004 | Kisono .................... | 709/217 |
| 2005/0030580 A1* | 2/2005 | Moroi ...................... | 358/1.15 |
| 2005/0132091 A1* | 6/2005 | Shibata ..................... | 710/4 |

FOREIGN PATENT DOCUMENTS

| | | | |
|---|---|---|---|
| JP | 2000-148623 A | 5/2000 | |
| JP | 2000-215034 A | 8/2000 | |
| JP | 2001-309099 A | 11/2001 | |
| JP | 2003-125146 A | 4/2003 | |

(Continued)

OTHER PUBLICATIONS

Japanese Patent Office Notification of Reason for Refusal for Japanese Patent Application No. 2005-236931, dated Aug. 7, 2007, and English translation thereof.

*Primary Examiner*—Douglas Q Tran
(74) *Attorney, Agent, or Firm*—Buchanan Ingersoll & Rooney PC

(57) ABSTRACT

An image forming apparatus is provided with an attribution information obtaining portion for obtaining application module list information on a function that resides in another image forming apparatus when the image forming apparatus is connected to the other image forming apparatus via a communication line, an unequipped function determining portion for determining whether or not the other image forming apparatus has a predetermined function that resides in the image forming apparatus based on the obtained application module list information of the other image forming apparatus, and a function expansion commanding portion for instructing the other image forming apparatus to perform a function expansion process to provide the other image forming apparatus with the predetermined function when the other image forming apparatus does not have the predetermined function.

13 Claims, 21 Drawing Sheets

FOREIGN PATENT DOCUMENTS

| | | |
|---|---|---|
| JP | 2003-333261 A | 11/2003 |
| JP | 2004-112715 A | 4/2004 |
| JP | 2004-194219 A | 7/2004 |
| JP | 2004-318644 A | 11/2004 |
| JP | 2004-362458 A | 12/2004 |
| JP | 2005-197935 A | 7/2005 |

\* cited by examiner

| SERVICE NAME | DES SERVICE MODULE |
|---|---|
| IDENTIFICATION NUMBER | 1111-9492-3654 |
| API NAME | Encryp_toDes()<br>StoreWithDes()<br>⋮ |
| MFP-COMPLIANT API | •fopen()<br>•fclose()<br>⋮ |

| FUNCTION NAME | DES ENCRYPT HDD SAVE |
|---|---|
| NECESSARY SERVICE MODULE | DES SERVICE MODULE<br><br>DES SERVICE MODULE  Version1.0<br>⋮ |
| HARDWARE | • AVAILABLE STORAGE SPACE OF 5M OR MORE<br>• HDD Installed<br>• CPU 500 MHZ OR MORE |

| IP ADDRESS | 192.168.40.1 |
|---|---|
| HARDWARE SPECIFICATIONS | CPU: 633MHz<br>RAM: 128MB<br>HDD: 10GB |
| HARDWARE OPERATING CONDITIONS | RAM: 90MB AVAILABLE<br>HDD: 7GB AVAILABLE |
| VIRTUAL NETWORK NAME | v_network_007 |

FIG. 8

(User1)

NAME: M. Murakami

PASSWORD: *****

ADRESS: murakami@******

DESTINATION: FAX 194-2230

ADDRESS BOOK: * * * *

⋮

— 72

(User2)

NAME: M. Murakami

PASSWORD: *****

ADRESS: murakami@******

DESTINATION: FAX 194-2230

(MFP 1)
FUNCTION LEVEL:Level 3
INSTALLATION LOCATION:
SHINAGAWA, TOKYO
IP ADDRESS :192.168.40.2

(MFP 2)
FUNCTION LEVEL:Level 3
INSTALLATION LOCATION :
SHINAGAWA, TOKYO
IP ADDRESS :192.168.40.3

(MFP 3)
FUNCTION LEVEL:Level 2
INSTALLATION LOCATION:
ITAMI, HYOGO
:192.168.20.7
SUBSTITUTE MFP:192.168.20.10

IMAGE FORMING APPARATUS, IMAGE PROCESSING SYSTEM, METHOD FOR EXPANDING FUNCTION OF IMAGE FORMING APPARATUS AND METHOD FOR FORMING VIRTUAL NETWORK

This application is based on Japanese Patent Application No. 2005-236931 filed on Aug. 17, 2005, the contents of which are hereby incorporated by reference.

BACKGROUND OF THE INVENTION

1. Field of the Invention

The present invention relates to image forming apparatuses such as MFPs and to systems including the same.

2. Description of the Related Art

Image forming apparatuses that have various functions including a copier, a scanner and a fax machine and are called multifunction devices or MFPs (Multi Function Peripherals) have been widely used in offices or other places. Such image forming apparatuses have recently had an Ethernet (registered trademark) connect function, so that the image forming apparatus can perform various processes in cooperation with other image forming apparatuses.

There are proposed some methods that are described in Japanese Unexamined Patent Publication Nos. 2000-148623 and 2004-112715 in order for plural image forming apparatuses to perform processes in cooperation with one another.

According to the method described in Japanese Unexamined Patent Publication No. 2000-148623, an image forming apparatus compares its own software version information with software version information that is transmitted by another image forming apparatus. Then, the former image forming apparatus determines whether or not both the devices can be interconnected functionally according to the comparison result.

According to the method described in Japanese Unexamined Patent Publication No. 2004-112715, it is first presented to a user whether or not a function connected/added to a network is provided to another equipment. When the user permits the provision, equipment within a connection range is notified of a novel equipment/function. When a connection permission application from the equipment of a party is received, a communication control part displays a picture for presenting whether or not the connection permission application is accepted to the user and when the user permits the connection, a connection permission response is transmitted to the equipment of the party and registered in connection permitted equipment information. Such a method is used to limit connection from other image forming apparatus or function provision to other image forming apparatus in accordance with the intention of a user of each image forming apparatus.

According to the conventional methods as described in Japanese Unexamined Patent Publication Nos. 2000-148623 and 2004-112715, even if an image forming apparatus having a new function is newly added to a network including plural image forming apparatuses, a function level in the entire network is adjusted to a function level of the existing image forming apparatuses. Accordingly, the new function cannot be utilized sufficiently.

SUMMARY OF THE INVENTION

The present invention is directed to solve the problems pointed out above, and therefore, an object of the present invention is to extend the range of utilization of a new function that resides in an image forming apparatus that is newly added to a network, compared to conventional image forming apparatuses and conventional methods.

According to one aspect of the present invention, an image forming apparatus is one having a function of exchanging data via a communication line. The image forming apparatus includes a function information obtaining portion for obtaining function information on a function that resides in another image forming apparatus when the image forming apparatus is connected to the other image forming apparatus via the communication line, a function presence determining portion for determining whether or not the other image forming apparatus has a predetermined function that resides in the image forming apparatus based on the function information of the other image forming apparatus, the function information being obtained by the function information obtaining portion, and a function expansion commanding portion for instructing the other image forming apparatus to perform a function expansion process to provide the other image forming apparatus with the predetermined function when the function presence determining portion determines that the other image forming apparatus does not have the predetermined function.

Preferably, the image forming apparatus further includes a data exchange control portion for allowing the image forming apparatus to exchange predetermined data using the predetermined function with the other image forming apparatus having the predetermined function and for forbidding the image forming apparatus to exchange the predetermined data with the other image forming apparatus without the predetermined function.

According to another aspect of the present invention, an image forming apparatus includes a function information obtaining portion for obtaining function information on a function that resides in another image forming apparatus when the image forming apparatus is connected to the other image forming apparatus via the communication line, a function presence determining portion for determining whether or not the image forming apparatus has a predetermined function that resides in the other image forming apparatus based on the function information of the other image forming apparatus, the function information being obtained by the function information obtaining portion, and a function expansion process portion for performing a function expansion process to provide the image forming apparatus with the predetermined function when the function presence determining portion determines that the image forming apparatus does not have the predetermined function.

The present invention makes it possible to extend the range of utilization of a new function that resides in an image forming apparatus that is newly added to a network, compared to conventional image forming apparatuses and conventional methods.

These and other characteristics and objects of the present invention will become more apparent by the following descriptions of preferred embodiments with reference to drawings.

BRIEF DESCRIPTION OF THE DRAWINGS

FIG. 5 shows an example of service module attribution information.

FIG. 6 shows an example of application module attribution information.

FIG. 7 shows an example of device attribution information.

FIG. 8 shows an example of user information.

FIG. 15 shows an example of device list information.

DESCRIPTION OF THE PREFERRED EMBODIMENTS

Figure 1:
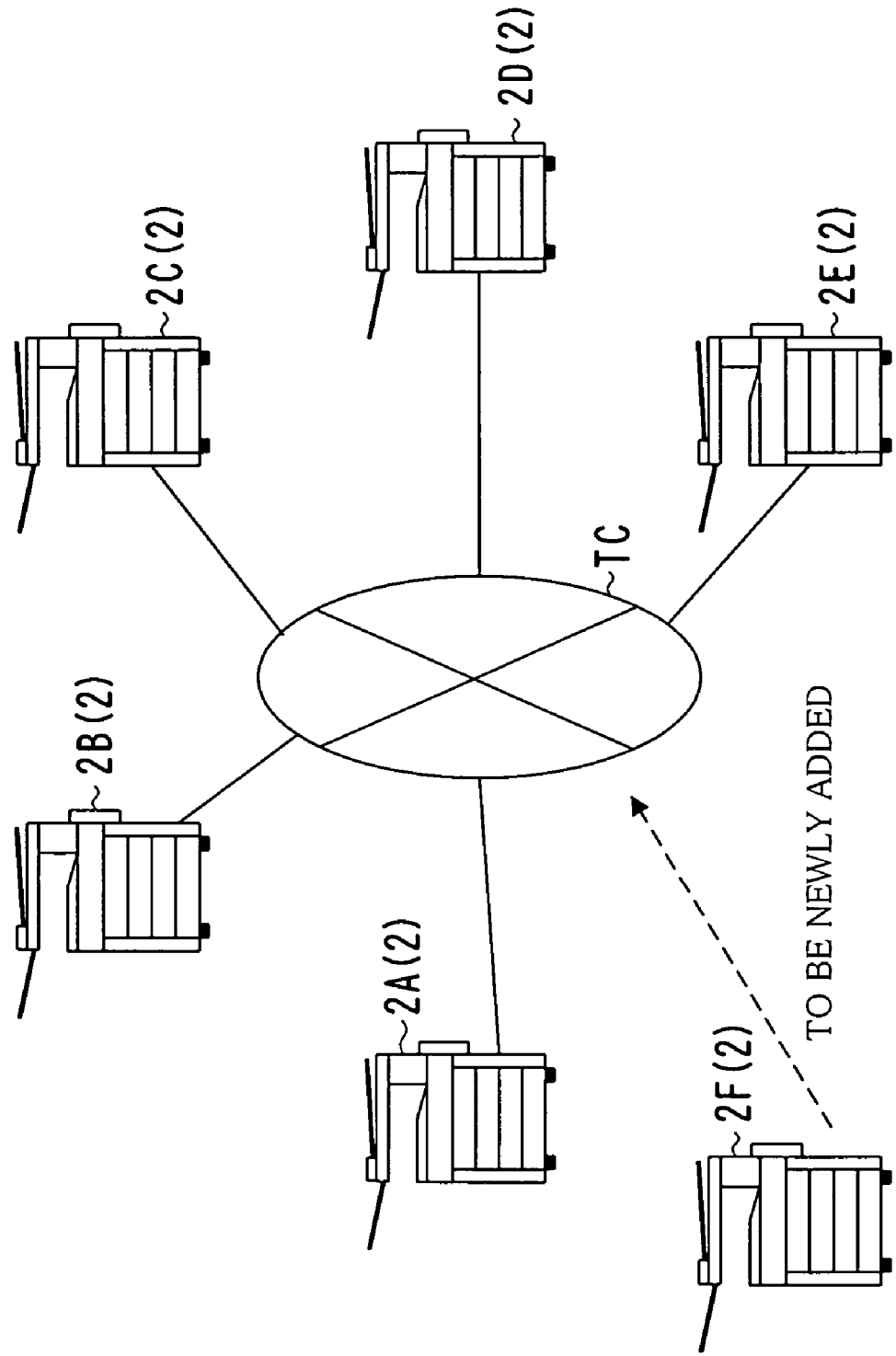
FIG. 1 is a diagram showing an example of an overall configuration of an image processing system.
Figure 2:
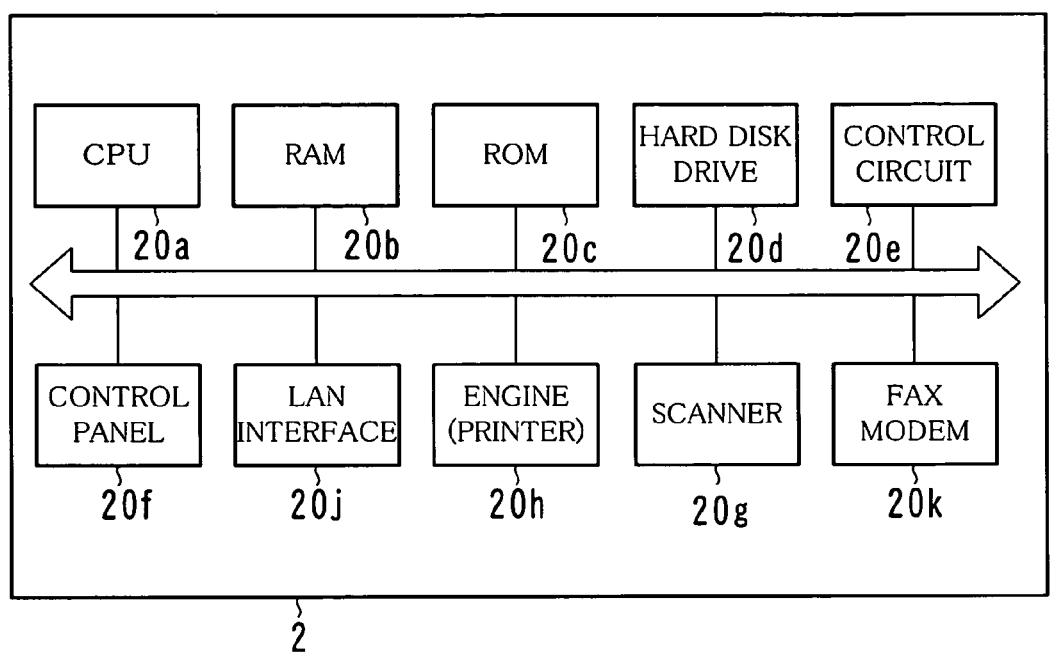
FIG. 2 is a diagram showing an example of a hardware configuration of an image forming apparatus.
Figure 3:
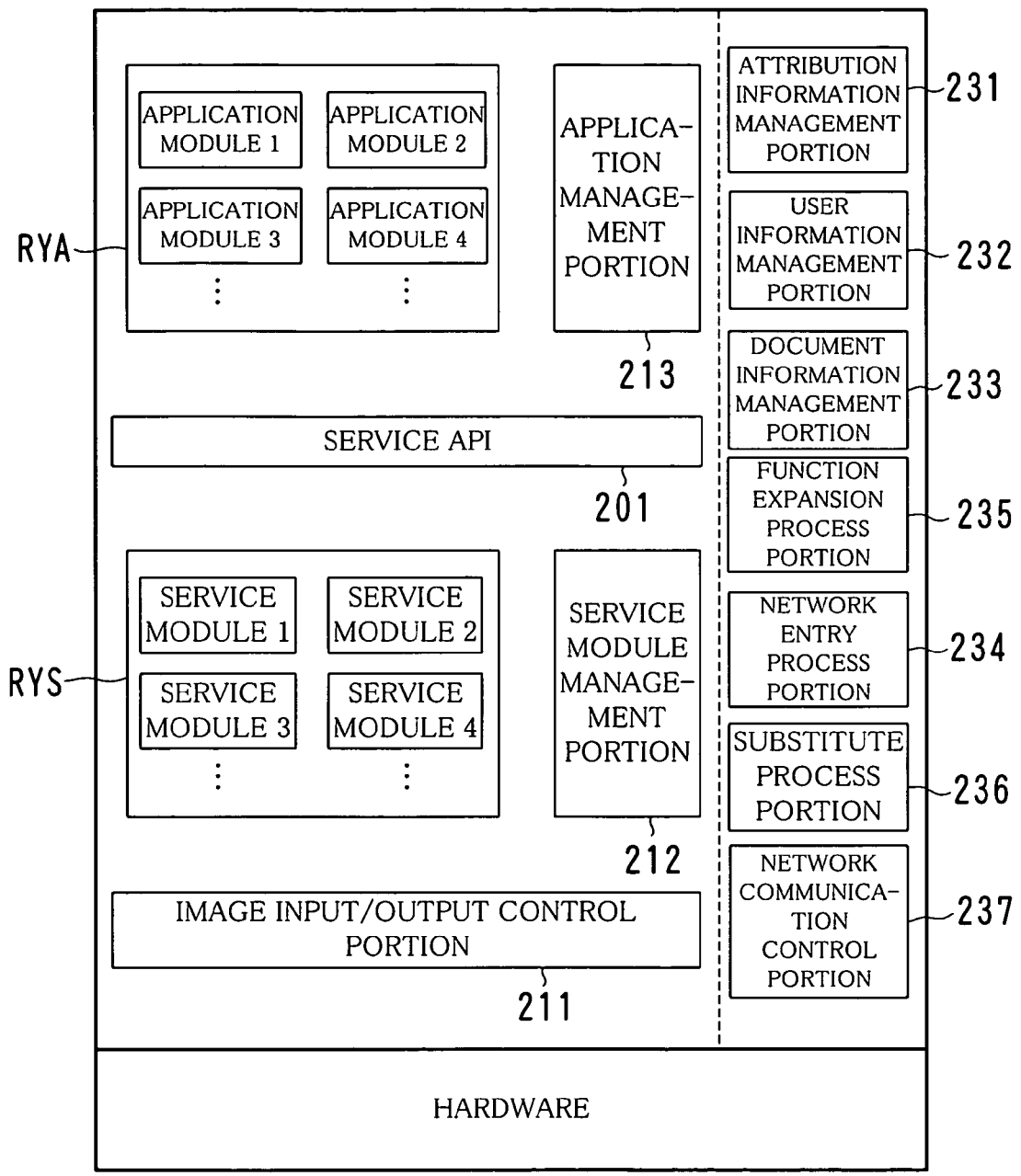
FIG. 3 is a diagram showing an example of a functional structure of the image forming apparatus.
Figure 4:
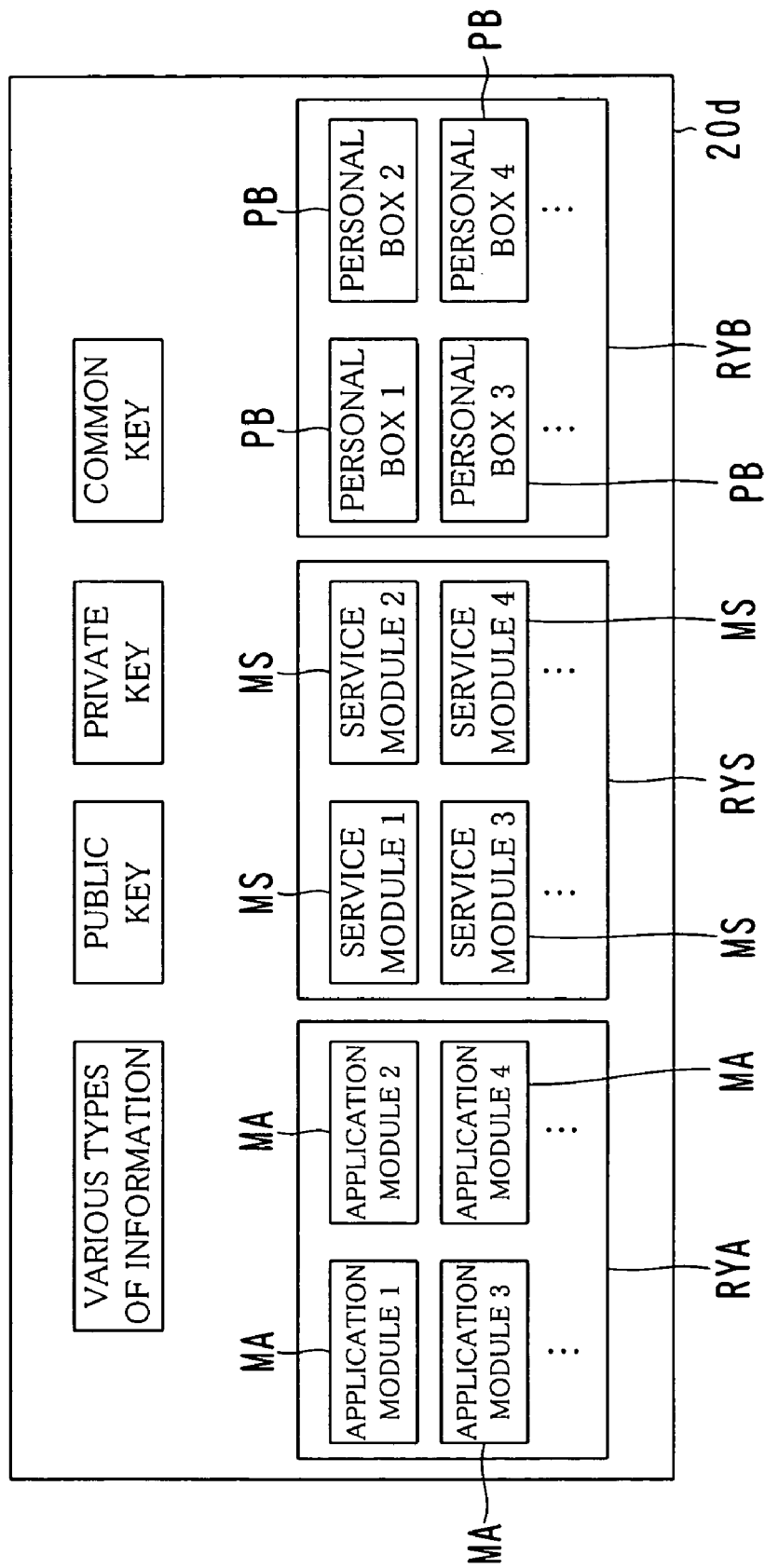
FIG. 4 is a diagram showing an example of a storage area and others that are provided in a hard disk drive.

FIG. 1 is a diagram showing an example of an overall configuration of an image processing system 1, FIG. 2 is a diagram showing an example of a hardware configuration of an image forming apparatus 2, FIG. 3 is a diagram showing an example of a functional structure of the image forming apparatus 2 and FIG. 4 is a diagram showing an example of a storage area and others that are provided in a hard disk drive 20d.

Referring to FIG. 1, the image processing system 1 according to the present invention includes a plurality of the image forming apparatuses 2 and a communication line TC. In this embodiment, a case is described in which five image forming apparatuses 2 make up the image processing system 1. The image forming apparatuses 2 are hereinafter sometimes referred to as an "image forming apparatus 2A", an "image forming apparatus 2B"..., and an "image forming apparatus 2E" individually. It should be noted that an image forming apparatus 2F is an image forming apparatus 2 that is about to newly participate in the image processing system 1. This will be described later.

These image forming apparatuses 2 (2A-2E) can be interconnected via the communication line TC that can be a LAN line, the Internet, a public line or a dedicated line.

The image forming apparatuses 2 are processors in each of which functions of a copier, a scanner, a fax machine, a network printer, a document server and others are consolidated. The image forming apparatuses 2 are also sometimes called multifunction devices or multifunction peripherals (MFP).

"Network printing" is a service of receiving image data from a terminal such as a personal computer to print an image on a sheet of paper. Such a service is also sometimes called a "network printer", "PC print" or the like.

"Document server" is a service of providing for each user a storage area that is called a "personal box", a "box" or the like and corresponds to a folder, a directory or the like in a personal computer to manage the storage area. Users can save image data or others in their own personal boxes on a file basis.

The image forming apparatus 2 is installed in an office such as a public office or a company, in a public facility such as a school or a library, in a store such as a convenience store and in various other places. The image forming apparatus 2 can be shared by plural users.

As described earlier, these image forming apparatuses 2 can be interconnected via the communication line TC. Some of them develop a virtual network depending on levels of functions supported by the respective image forming apparatuses 2.

For example, only the image forming apparatuses 2 having security functions at a predetermined level or higher can group together to form one virtual network. Then, the image forming apparatuses 2 that participate in the virtual network can be configured to exchange a file including confidential information or the like only with other image forming apparatuses 2 that participate in the identical virtual network. A method for developing a virtual network will be described later.

Referring to FIG. 2, the image forming apparatus 2 includes a CPU 20a, a RAM 20b, a ROM 20c, the hard disk drive 20d, a control circuit 20e, a control panel 20f, a scanner 20g, a printer 20h, a LAN interface 20j and a FAX modem 20k.

The control circuit 20e is a circuit for controlling the hard disk drive 20d, the control panel 20f, the scanner 20g, the printer 20h, the LAN interface 20j and the FAX modem 20k.

The scanner 20g is a device for optically reading an image of a content such as a text, a mathematical formula, a symbol, a photograph, a chart or an illustration that is depicted on the original to generate image data.

The printer 20h serves to print an image on a sheet of paper based on image data captured by the scanner 20g or image data transmitted by a personal computer or the like.

The LAN interface 20j is an NIC (Network Interface Card) for communicating with other devices and is used to connect the image forming apparatus 2 to a hub or a router that constitutes the communication line TC. The FAX modem 20k is a device for communicating with other image forming apparatuses or other FAX terminals using a FAX protocol.

The control panel 20f includes a touch panel liquid crystal display and a numeric keypad. On the liquid crystal display are displayed a picture for giving a message or directions to a user, a picture for prompting the user to enter types and conditions of desired processes and a picture for displaying process results executed by the CPU 20a or others. While viewing these pictures, the user can operate the liquid crystal display or the numeric keypad to give the image forming apparatus 2 a command for starting a process or a command for discontinuing a process, to specify process conditions including data destination, printing conditions and scanning conditions and to specify various other matters. Thus, the control panel 20f plays a role as a user interface for a user who operates the image forming apparatus 2.

Referring to FIG. 3, the hard disk drive 20d stores programs and data for realizing functions of a service API 201, an image input/output control portion 211, a service module management portion 212, an application management portion 213, an attribution information management portion 231, a user information management portion 232, a document information management portion 233, a network entry process portion 234, a function expansion process portion 235, a substitute process portion 236, a network communication control portion 237 and others. These programs and data are read out to the RAM 20b as required and the programs are executed by the CPU 20a. All or part of these programs or data may be memorized in the ROM 20c. Alternatively, all or part of the functions shown in FIG. 3 may be realized by the control circuit 20e.

Additionally, referring to FIG. 4, the hard disk drive 20d is provided with an application module storage area RYA for storing application modules MA, a service module storage area RYS for storing service modules MS, a personal box storage area RYB for ensuring personal boxes PB. Further, the hard disk drive 20d stores various types of information, a set of a public key and a private key for a public key cryptosystem, a common key (a private key) for a symmetric key cryptosystem and others. It should be noted that the CPU 20a executes the application modules MA and the service modules MS.

Hereinafter, detailed descriptions are given of process contents of the portions included in the image forming apparatus 2 shown in FIG. 3, the application modules MA and the service modules MS.

Figure 9:
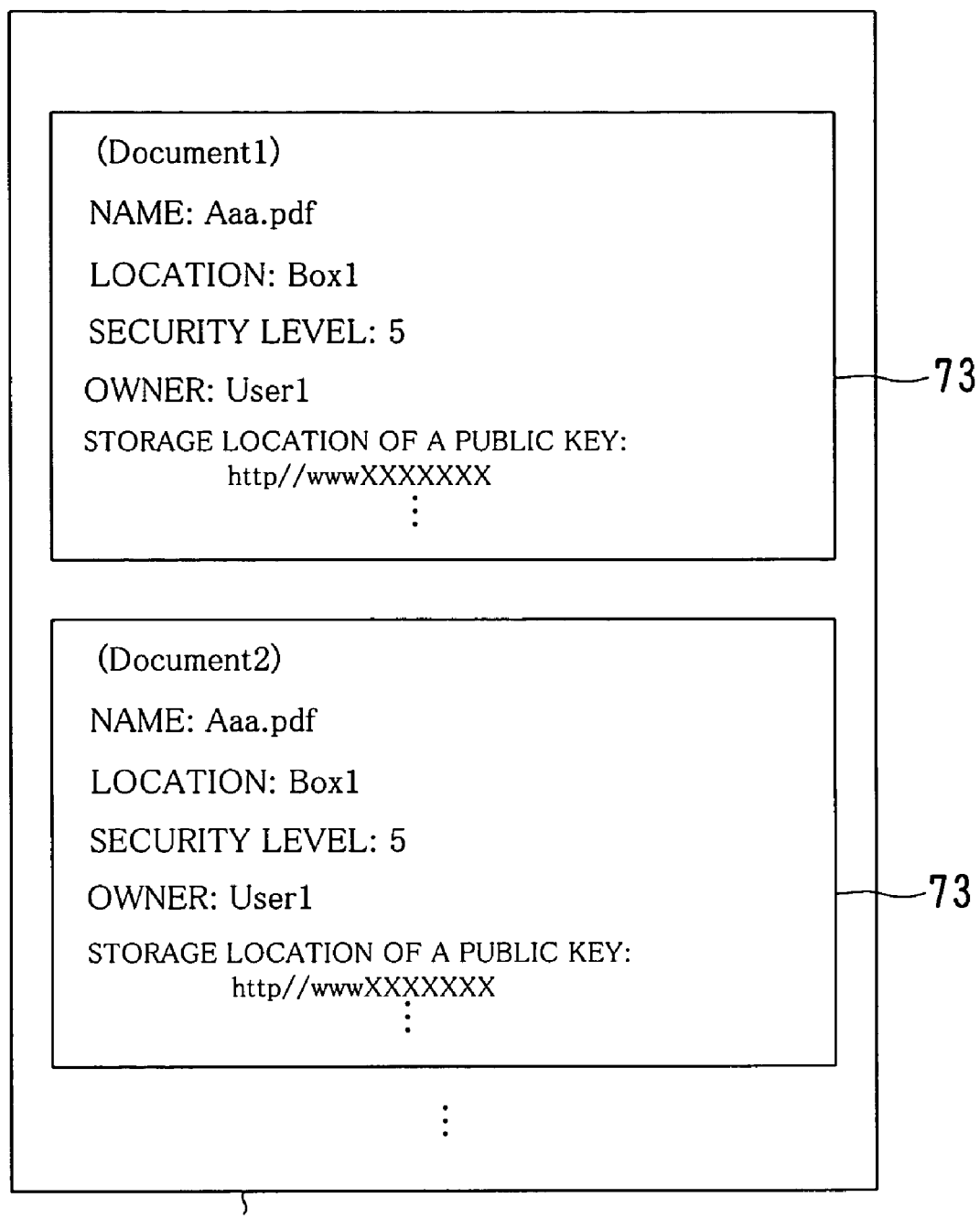
FIG. 9 shows an example of document information.

FIG. 5 shows an example of service module attribution information 7S, FIG. 6 shows an example of application module attribution information 7A, FIG. 7 shows an example of device attribution information 71, FIG. 8 shows an example of user information 72 and FIG. 9 shows an example of document information 73.

The service API 201, the image input/output control portion 211 and the service module management portion 212 shown in FIG. 3 are included in an operating system (OS) of the image forming apparatus 2.

In the service module storage area RYS of the image forming apparatus 2 are prepared a module for performing a process of encrypting data based on Data Encryption Standard (DES), a module for performing a process of encrypting data based on Rivest-Shamir-Adleman (RSA), a module for performing a process of saving data in the hard disk drive 20d, a module for generating a booklet finishing output image, a module for performing a print process, a module for performing a process of retrieving data from the hard disk drive 20d, a module for decoding data based on the DES, a module for decoding data based on the RSA and various other service modules MS.

The service module management portion 212 performs a process for managing the service modules MS. The service module management portion 212, for example, downloads a new service module MS from other device or reads out the same from a recording medium such as a memory card or the like to add the downloaded/read service module MS to the service module storage area RYS. Further, the service module management portion 212 deletes (uninstalls) an unnecessary service module MS from the service module storage area RYS.

The service module management portion 212 also manages the service modules MS by memorizing the service modules MS in association with the service module attribution information 7S on a service module basis. Referring to FIG. 5, the service module attribution information 7S includes information on a module name (a service name) of the service module MS with which the service module attribution information 7S is associated, an identification number for differentiating the service module MS from the other service modules MS, an API name and an MFP-compliant API.

In the application module storage area RYA are prepared a module for performing a process of encrypting data to be saved in the hard disk drive 20d, a module for performing a process of copying the original to finish with the copy in the form of booklet, a module for performing a print process based on encrypted data saved in the hard disk drive 20d and various other application modules MA.

The application module MA is combined with the plural service modules MS and coded, so that it performs applied processes. In other words, it can be said that the service modules MS are component programs for providing the application modules MA with small-scale services.

The application management portion 213 performs a process for managing the application modules MA. The application management portion 213, for example, downloads a new application module MA from other device or reads out the same from a recording medium such as a memory card or the like to add the downloaded/read application module MA to the application module storage area RYA. Further, the application management portion 213 deletes an unnecessary application module MA from the application module storage area RYA.

The application management portion 213 also memorizes the application modules MA in association with the application module attribution information 7A on an application module basis and manages the application modules MA. Referring to FIG. 6, the application module attribution information 7A includes information on a module name (a function name) of the application module MA with which the application module attribution information 7A is associated, a necessary service module MS and necessary hardware conditions (hardware outlines).

Note that not all the image forming apparatuses 2 included in the image processing system 1 incorporate the same service module MS and the same application module MA. The service module MS and the application module MA installed in the image forming apparatuses 2 may be different depending on model or sale period of the apparatuses. Further, in some cases, these modules are additionally installed in line with functions of other image forming apparatuses 2 as described later.

The service API 201 is an application program interface (API) for calling the service module MS indicated in the application module MA from the service module storage area RYS.

The image input/output control portion 211 controls the RAM 20b, the hard disk drive 20d, the control circuit 20e, the control panel 20f, the scanner 20g, the printer 20h, the LAN interface 20j and the FAX modem 20k of the image forming apparatus 2 where that image input/output control portion 211 is included, so that a process relating to image input/output is performed. The image input/output control portion 211 corresponds to a kernel or a microkernel in a personal computer.

The attribution information management portion 231 memorizes and manages the device attribution information 71 on overall attribution of the image forming apparatus 2 where that attribution information management portion 231 is included. Referring to FIG. 7, the device attribution information 71 includes information on an IP address, hardware specifications, and operating conditions of hardware of the image forming apparatus 2 itself and on a name of a virtual network (a virtual network name) to which the image forming apparatus 2 belongs. Note that one image forming apparatus 2 can belong to a plurality of virtual networks.

An administrator presets the IP address and the virtual network name included in the device attribution information 71. The virtual network to which the image forming apparatus 2 belongs may be changed appropriately after starting operation of the image forming apparatus 2.

The user information management portion 232 memorizes and manages the user information 72 for users who mainly use the image forming apparatus 2 on a user basis. Referring to FIG. 8, the user information 72 includes information on a user name (NAME), a password (PASSWORD), an electronic mail address (ADDRESS), a FAX number (DESTINATION) and an address book of the corresponding user.

Users can set contents of the user information 72 of their own. Since the user name is used as a user ID, it is necessary to avoid overlap with user names of the other users.

The document information management portion 233 memorizes and manages document information 73 for each file stored in the personal boxes PB that are provided in the personal box storage area RYB of the image forming apparatus 2. Referring to FIG. 9, the document information 73 includes information on a file name (NAME), a name of a personal box PB as a storage location (LOCATION), a security level (SECURITY) and an owner of that file, and a storage location of a public key that is used for decoding the file.

A user who owns the file (an owner) can arbitrarily determine the file name of the document information 73. It is, however, necessary to avoid overlap with file names of the other files saved in the identical personal box PB. The other contents of the document information 73 can be automatically determined in accordance with a storage location of the file, an encryption key used for encryption and others.

Note that when confidential information is included in a file pertaining to the document information 73, it is desirable that a key of the image forming apparatus 2 itself be used to encrypt the document information 73.

Figure 10:
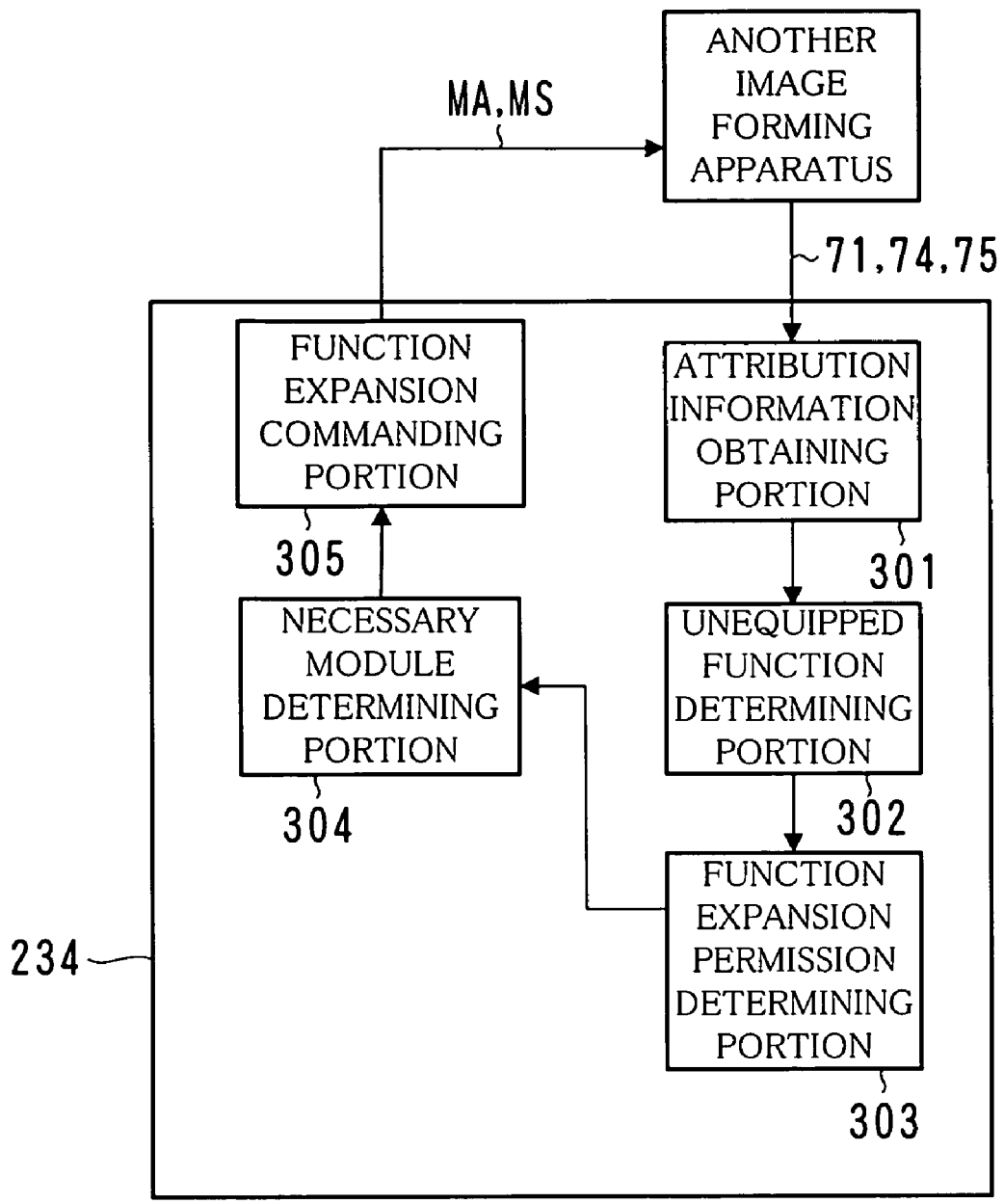
FIG. 10 is a diagram showing an example of a configuration of a network entry process portion.
Figure 11:
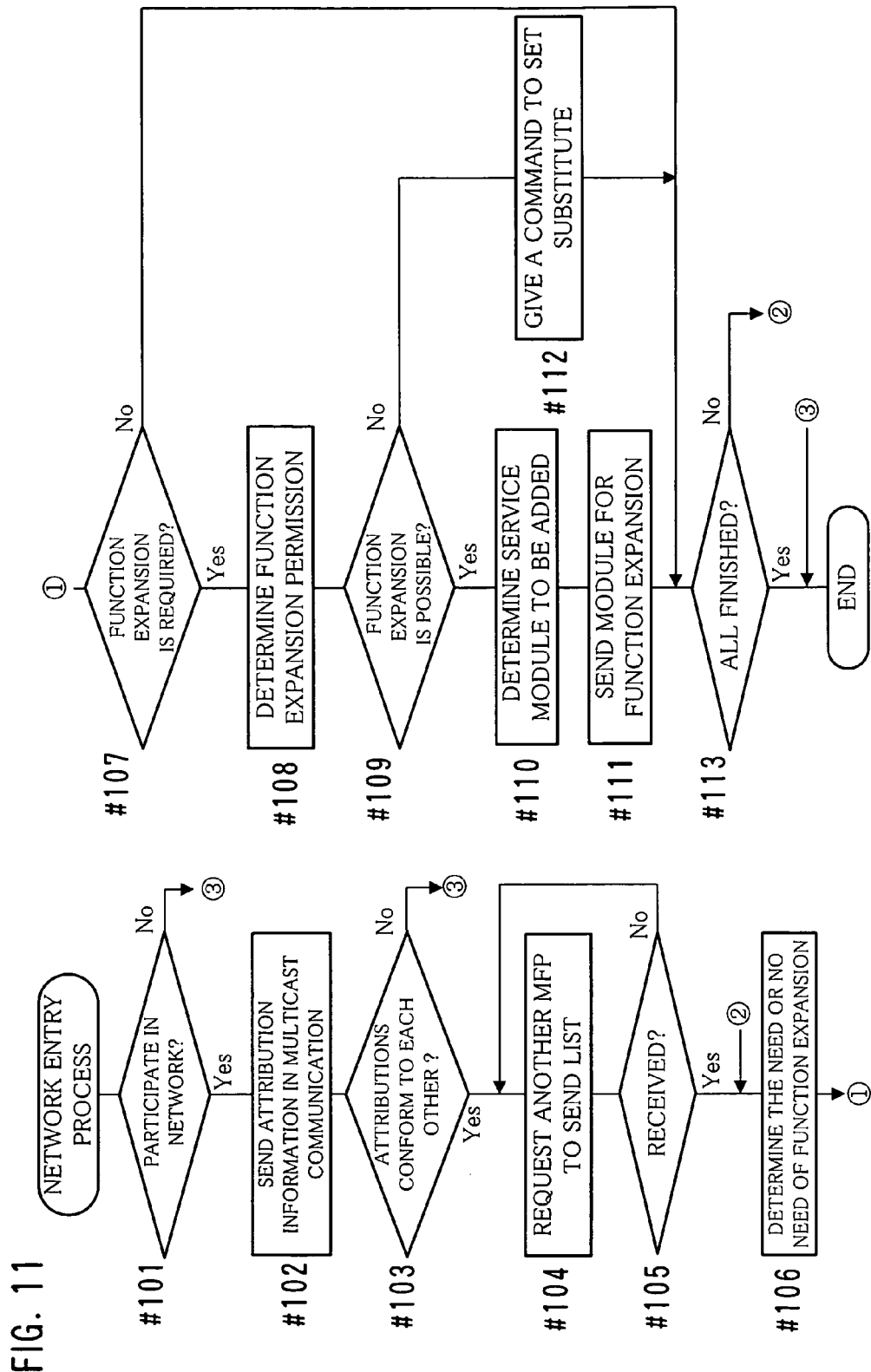
FIG. 11 is a flowchart showing an example of a flow of a network entry process.

FIG. 10 is a diagram showing an example of a configuration of the network entry process portion 234 and FIG. 11 is a flowchart showing an example of a flow of a network entry process.

Referring to FIG. 10, the network entry process portion 234 includes an attribution information obtaining portion 301, an unequipped function determining portion 302, a function expansion permission determining portion 303, a necessary module determining portion 304 and a function expansion commanding portion 305. When the image forming apparatus 2 joins the image processing system 1 for the first time, the network entry process portion 234 performs, if necessary, a process for expanding (newly adding or updating) functions of the other image forming apparatuses 2 that already participate in the same virtual network as the image forming apparatus 2 that joins for the first time. As shown in FIG. 1, for example, when the "image forming apparatus 2F" newly joins the image processing system 1, the network entry process portion 234 of the image forming apparatus 2F performs a process for expanding functions of the image forming apparatuses 2 that are included in the existing image forming apparatuses 2A-2E and belong to the same virtual network as the image forming apparatus 2F.

The attribution information obtaining portion 301 in the network entry process portion 234 obtains the device attribution information 71 for the other image forming apparatuses 2 that already participate in the same virtual network, application module list information 74 that indicates a list of the application modules MA installed on the other image forming apparatuses 2 and service module list information 75 that indicates a list of the service modules MS installed on the other image forming apparatuses 2.

The unequipped function determining portion 302 compares application module attribution information 7A for the image forming apparatus 2 itself with application module attribution information 7A that is obtained from the other image forming apparatuses 2, then to determine a function (application) that is installed on the image forming apparatus 2 itself and not installed on the other image forming apparatuses 2. In other words, the unequipped function determining portion 302 determines an application module MA that is indicated in the former but not indicated in the latter. Note that a determination can be made only with respect to an application module MA relating to a specific purpose instead of making a determination with respect to all the application modules MA. For example, a determination can be made only with respect to an application module MA for security protection.

The function expansion permission determining portion 303 determines, based on application module attribution information 7A of the application module MA and device attribution information 71 of the other image forming apparatus 2, whether or not an application module MA that is not installed on other image forming apparatus 2 can be applied to the other image forming apparatus 2. The application module MA is determined by the unequipped function determining portion 302. In other words, it is checked whether or not specifications of the other image forming apparatus 2 and operating conditions of hardware, which are indicated in the device attribution information 71, satisfy a hardware outline specified in the application module attribution information 7A. If the hardware outline is satisfied, it is determined that the application module MA can be applied. If the hardware outline is not satisfied, it is determined that the application module MA cannot be applied.

The necessary module determining portion 304 determines a service module MS to be added to the other image forming apparatus 2 so that the other image forming apparatus 2 realizes the application module MA which is determined not to be installed on the other image forming apparatus 2 at this time by the unequipped function determining portion 302. When the function expansion permission determining portion 303 determines that the application module MA can not be applied to the other image forming apparatus 2, however, a determination step by the necessary module determining portion 304 is skipped. The necessary module determining portion 304 performs a determination process, for example, in the following manner.

First, service modules MS necessary for the application module MA are checked with reference to the application module attribution information 7A of the application module MA.

Then, it is checked whether or not the necessary service modules MS thus checked are indicated in the application module list information 74 for the other image forming apparatus 2. When all of the necessary service modules MS are specified, it is determined that no other service modules MS are to be added. When service modules MS that are not specified are present, it is determined that the service modules MS are ones to be added to the other image forming apparatus 2.

The function expansion commanding portion 305 instructs the other image forming apparatus 2 to apply the application module MA that is not installed on the other image forming apparatus 2 to expand functions. The application module MA is determined by the unequipped function determining portion 302. On this occasion, the application module MA is transmitted to the other image forming apparatus together with the service modules MS that are determined to be added to the other image forming apparatus 2 by the necessary module determining portion 304. When the function expansion permission determining portion 303 determines that the application module MA can not be applied to the other image forming apparatus 2, the function expansion commanding portion 305 instructs the other image forming apparatus 2 to perform a setting for preparing a substitute image forming apparatus 2.

Here, descriptions are provided, with reference to a flowchart shown in FIG. 11, of-process procedures in the network entry process portion 234 when the image forming apparatus 2F is newly installed in the image processing system 1.

An administrator of the image forming apparatus 2F presets an IP address, a virtual network name of a virtual network in which the image forming apparatus 2F will participate and others before the image forming apparatus 2F joins the image processing system 1. Then, the administrator connects the LAN interface 20j of the image forming apparatus 2F to network equipment such as a hub or a router of the communication line TC with a cable, or the like and turns on the image forming apparatus 2F.

Then, the image forming apparatus 2F newly joins the image processing system 1 (Yes in #101 in FIG. 11). The network entry process portion 234 of the image forming apparatus 2F starts a process for expanding functions of the other existing image forming apparatuses 2 in the following manner.

More specifically, the network entry process portion 234 transmits device attribution information 71 of the image forming apparatus 2F itself to the image forming apparatuses 2A-2E respectively in multicast communication to inform them that the image forming apparatus 2F itself participates in the image processing system 1. Then, the network entry process portion 234 obtains respective device attribution information 71 of the image forming apparatuses 2A-2E (#102).

The image forming apparatus 2F determines the image forming apparatuses 2 that belong to a virtual network in which the image forming apparatus 2F itself will participate based on the device attribution information 71 thus obtained and the device attribution information 71 for the image forming apparatus 2F itself (#103). When such image forming apparatuses 2 are found (Yes in #103), the image forming apparatuses 2 are requested to transmit respective lists of modules that are currently installed thereon, i.e., the respective application module list information 74 and the respective service module list information 75 (#104). Here, suppose that all of the image forming apparatuses 2A-2E belong to the identical virtual network. The request is made to each of the image forming apparatuses 2A-2E. Hereinafter, an image forming apparatus 2 that already belongs to a virtual network in which the image forming apparatus 2F will participate is sometimes referred to as an "existing image forming apparatus 2'".

When receiving the application module list information 74 and the service module list information 75 from each of the existing image forming apparatuses 2' (Yes in #105), the image forming apparatus 2F performs the following process on each of the existing image forming apparatuses 2' based on the information thus received.

The image forming apparatus 2F determines an application module MA which is installed on the image forming apparatus 2F and is not installed on the existing image forming apparatus 2' (#106). When such an application module MA is found (Yes in #107), it is determined whether or not the application module MA is applicable to the existing image forming apparatus 2' (#108). When it is applicable (Yes in #109), a service module MS is determined which should be added to the existing image forming apparatus 2' in order to realize the application module MA (#110). Then, the application module MA and the service module MS to be added are transmitted to the existing image forming apparatus 2' and a command is issued to the existing image forming apparatus 2' so that functions are expanded (#111).

In contrast, when the found application module MA is not applicable (No in #109), the existing image forming apparatus 2' is instructed to make another image forming apparatus 2 perform a process concerning functions of the application module MA in place of the existing image forming apparatus 2' (#112).

The image forming apparatus 2F performs the process from Step #106 through Step #112 on each of the existing image forming apparatuses 2'.

Thus, when an image forming apparatus 2 joins the image processing system 1 for the first time, the network entry process portion 234 of the image forming apparatus 2 performs a process for adjusting a function of other existing image forming apparatuses 2 to a function of the image forming apparatus 2.

Figure 12:
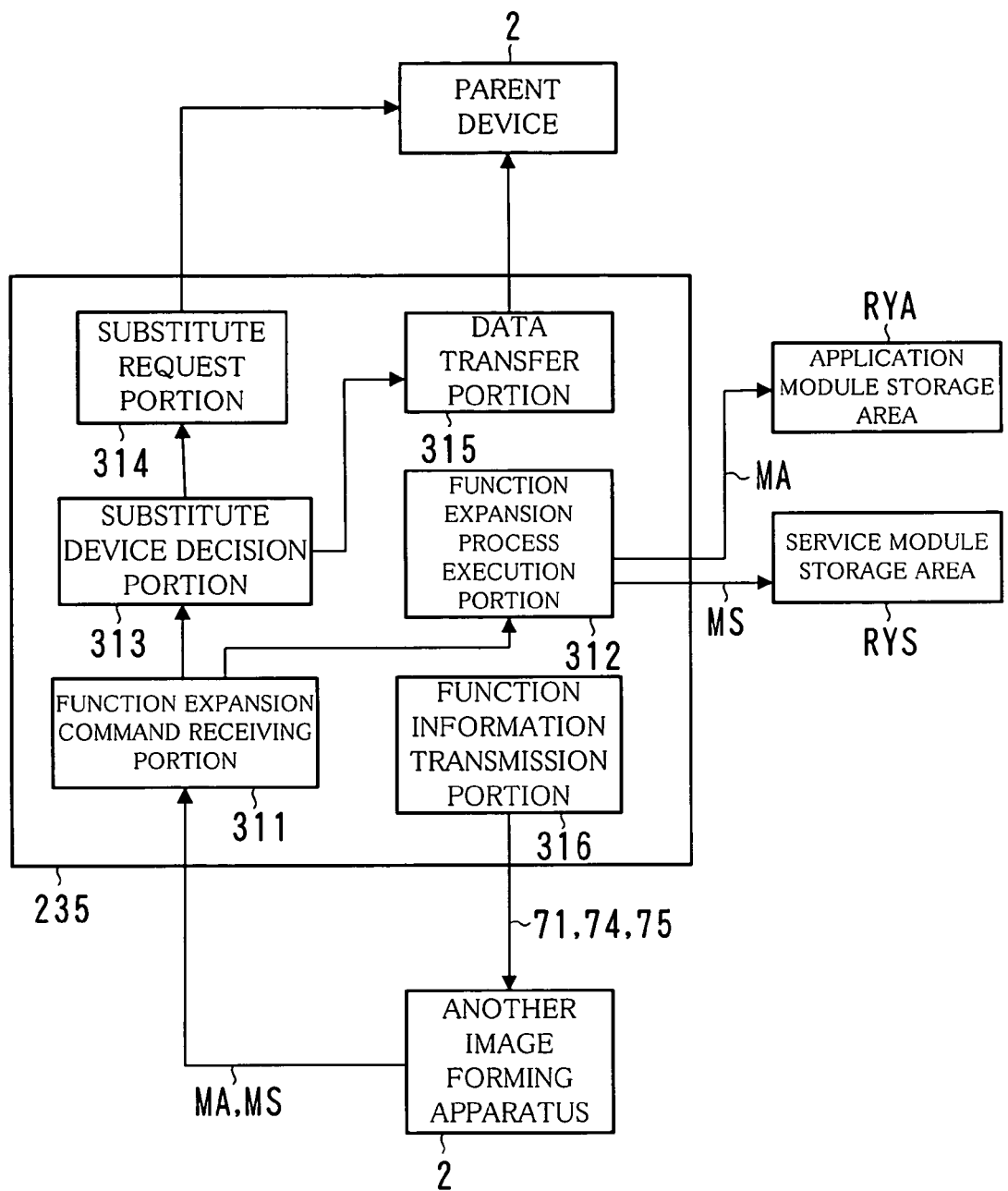
FIG. 12 is a diagram showing an example of a configuration of a function expansion process portion.
Figure 13:
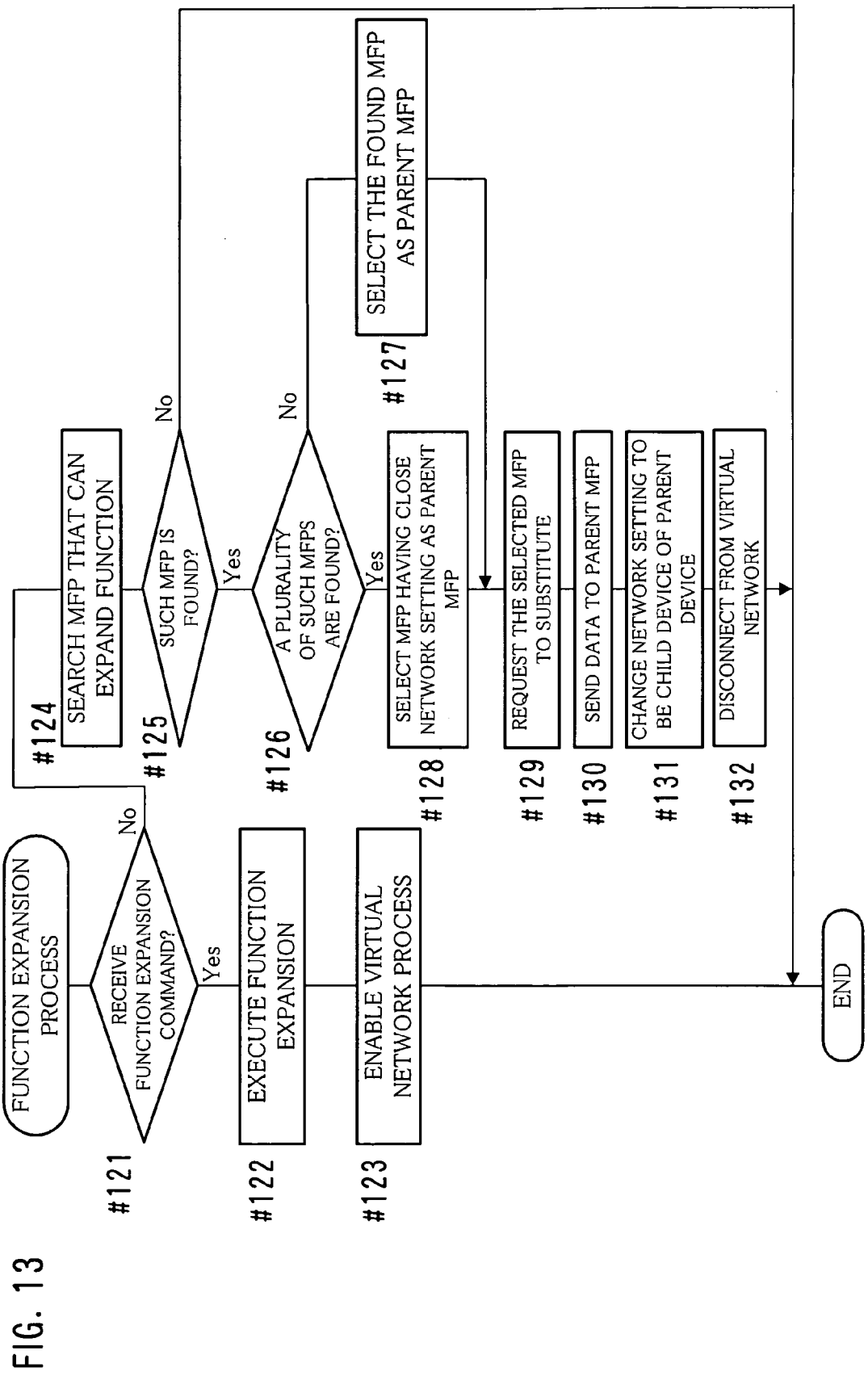
FIG. 13 is a flowchart showing an example of a flow of a process for expanding a function.

FIG. 12 is a diagram showing an example of a configuration of the function expansion process portion 235 and FIG. 13 is a flowchart showing an example of a flow of a process for expanding a function.

The function expansion process portion 235 performs a process for expanding a function of an image forming apparatus 2 itself that already joins the image processing system 1 in conformity with a function of another image forming apparatus 2 that will newly join the image processing system 1.

Referring to FIG. 12, the function expansion process portion 235 includes a function expansion command receiving portion 311, a function expansion process execution portion 312, a substitute device decision portion 313, a substitute request portion 314, a data transfer portion 315 and a function information transmission portion 316.

The function expansion command receiving portion 311 performs a process for receiving a function expansion command issued from another image forming apparatus 2 that newly participates in the image processing system 1 together with an application module MA and a necessary service module MS. In addition, the function expansion command receiving portion 311 performs a process for receiving a command indicating that another image forming apparatus 2 is made to perform a process concerning a function of an application module MA as a substitute.

When the function expansion command receiving portion 311 receives the function expansion command, the function expansion process execution portion 312 locally installs the application module MA and the necessary service module MS both of which are received together with the command on the application module storage area RYA and the service module storage area RYS of the image forming apparatus 2 itself respectively, so that a function of the image forming apparatus 2 itself is expanded.

When the image forming apparatus 2 receives the command for making another image forming apparatus 2 perform a process concerning a function of the application module MA as a substitute, the substitute device decision portion 313 determines another image forming apparatus 2 suitable as an apparatus that performs the process as a substitute. The other image forming apparatus 2 operating as a substitute may be hereinafter referred to as a "parent device". More specifically, another image forming apparatus 2 on which the application module MA is properly installed is determined to be a parent device. In this regard, however, when a plurality of such other image forming apparatuses 2 is present, a device whose network setting is the closest, e.g., a device whose IP address value is close is determined to be a parent device. It may be possible to determine that a device installed at the nearest location or a device having the highest performance is a parent device.

The substitute request portion 314 requests another image forming apparatus 2 that is selected as a parent device by the substitute device decision portion 313 to perform a process concerning a function of an application module MA as a substitute.

The data transfer portion 315 performs a process for transferring necessary data to the other image forming apparatus 2 determined to be a parent device. When the other image forming apparatus 2 performs a process, for example, for encrypting a file to save the encrypted file in a personal box PB as a substitute, the personal box PB that is locally provided at the present time and a file therein are transferred to the other image forming apparatus 2.

Likewise, when the function expansion process execution portion 312 attempts a function expansion process of an application module MA but fails, the substitute device decision portion 313, the substitute request portion 314 and the data transfer portion 315 perform processes for letting a parent device perform processes concerning the application module MA as a substitute.

The function information transmission portion 316 performs a process for transmitting the device attribution information 71, the application module list information 74 and the service module list information 75 of the image forming apparatus 2 including the function information transmission portion 316 when receiving a request to transmit these pieces of information from another image forming apparatus 2. These pieces of information are used in the network entry process portion 234 of the other image forming apparatus 2 that is the request source, as described earlier.

Here, descriptions are provided, with reference to a flowchart shown in FIG. 13, of process procedures in the function expansion process portion 235 when the image forming apparatus 2A receives a command issued from the image forming apparatus 2F that newly participates in the identical virtual network.

When receiving from the image forming apparatus 2F a command indicating that a function should be expanded together with an application module MA and a necessary service module MS (Yes in #121), the function expansion process portion 235 in the image forming apparatus 2A installs the application module MA and the service module MS to expand a function of the image forming apparatus 2A itself (#122). This makes it possible to perform a cooperation process via a virtual network between the image forming apparatus 2F that newly joins this time and other image forming apparatuses 2 that perform a function expansion process (#123). This will be described later.

When the image forming apparatus 2 receives a command for making another image forming apparatus 2 perform a process concerning a function of an application module MA as a substitute (No in #121), the function expansion process portion 235 in the image forming apparatus 2A searches an image forming apparatus 2 that can perform the process concerning a function of the application module MA among other image forming apparatuses 2 (#124).

When the function expansion process portion 235 finds only one image forming apparatus 2 of such kind (Yes in #125 and No in #126), the found image forming apparatus 2 is determined to be an MFP for substitute, i.e., a parent device (#127). When a plurality of such image forming apparatuses 2 is found (Yes in #125 and Yes in #126), an image forming apparatus 2, for example, whose network setting is the closest to that of the image forming apparatus 2A is determined to be a parent device (#128).

The image forming apparatus 2 that is determined to be a parent device is requested to substitute for the image forming apparatus 2A (#129) and necessary data are transmitted to the image forming apparatus 2 (#130). Then, setting is so performed that the image forming apparatus 2 thus determined is a parent device for the image forming apparatus 2A (#131). This setting can be performed by rewriting device list information 76. This will be described later.

In this way, a process is completed for substituting a device for a request source, i.e., the image forming apparatus 2A. After completing the process, when a user orders execution of a predetermined process, a parent device performs the process instead of the image forming apparatus 2A.

After this series of processes, the image forming apparatus 2A rewrites, if necessary, a virtual device name of the device attribution information 71 for the image forming apparatus 2A itself, so that the image forming apparatus 2A leaves the virtual network in which the image forming apparatus 2A participates at present (#132). For example, when a security level of the image forming apparatus 2A is below those of other image forming apparatuses 2, the image forming apparatus 2A leaves the virtual network. The image forming apparatus 2A informs other image forming apparatuses 2 which image forming apparatus 2 becomes a parent device as the need arises.

Figure 14:
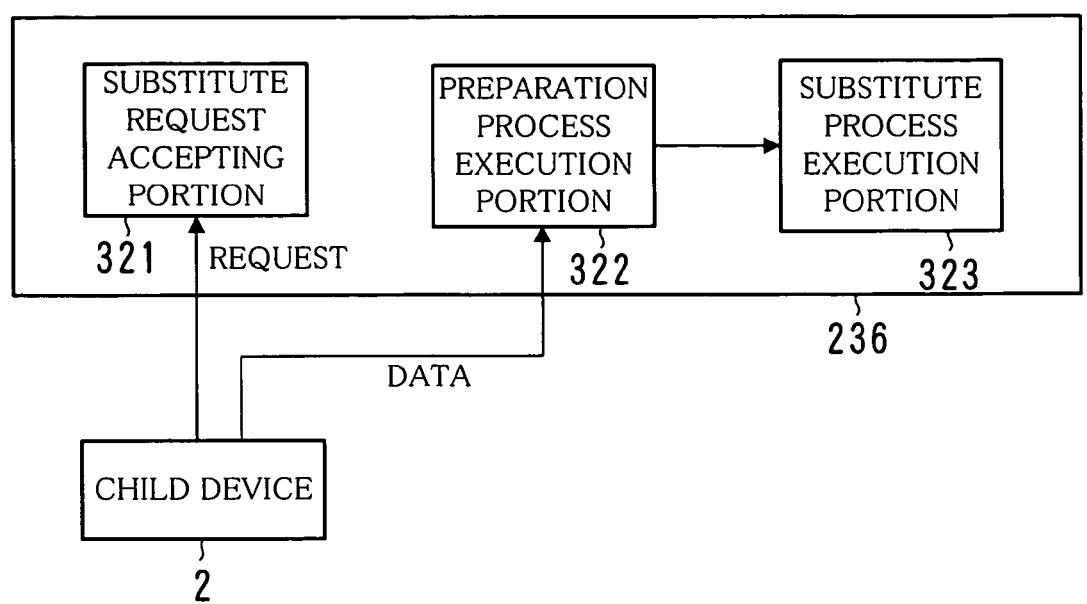
FIG. 14 is a diagram showing an example of a configuration of a substitute process portion.

FIG. 14 is a diagram showing an example of a configuration of the substitute process portion 236 and FIG. 15 shows an example of the device list information 76.

Referring back to FIG. 3, the substitute process portion 236 includes a substitute request accepting portion 321, a preparation process execution portion 322 and a substitute process execution portion. 323 as shown in FIG. 14 and performs a process for functioning as a parent device of other image forming apparatuses 2.

The substitute request accepting portion 321 performs a process for accepting a request, which is made by another image forming apparatus 2, indicative of a substitute of a process concerning a function of an application module MA. Hereinafter, the image forming apparatus 2 that is the request source is sometimes referred to as a "child device".

The preparation process execution portion 322 performs a preparation process necessary to perform a predetermined process instead of a child device. In the case of, for example, performing a process regarding management of a personal box PB in place of the child device, the preparation process execution portion 322 performs a process of receiving from the child device a personal box PB managed in the child device and a file saved in the personal box PB to store the same in a local personal box storage area RYB and performs other processes.

The substitute process execution portion 323 executes an application module MA in place of the child device and thereby substitutes for the child device.

Referring back to FIG. 3, the network communication control portion 237 has the device list information 76 and performs a control process regarding data communication with other image forming apparatuses 2 based on the device list information 76.

As shown in FIG. 15, the device list information 76 indicates information on a function level, an installation location and an IP address and others of each of other image forming apparatuses 2 that belong to the same virtual network as the image forming apparatus 2, or of each of other image forming apparatuses 2 that belonged thereto in the past.

Here, "function level" means a level of a function that resides in the other image forming apparatuses 2. When it means a level of a security function, it means a security level.

When a parent device (a substitute MFP) is set for the other image forming apparatus 2 that belonged to in the past, an IP address of the parent device is specified as information of the other image forming apparatus 2.

The network communication control portion 237 performs communication control based on such device list information 76 in the following manner. More specifically, with respect to a predetermined process, the network communication control portion 237 permits communication with other image forming apparatuses 2 that belong to the identical virtual network or other image forming apparatuses 2 that belonged thereto in the past and for which a parent device is set at the present time. Further, with respect to the predetermined process, the network communication control portion 237 forbids communication with other image forming apparatuses 2 that do not belong to the identical virtual network and for which no parent device is set.

Figure 16:
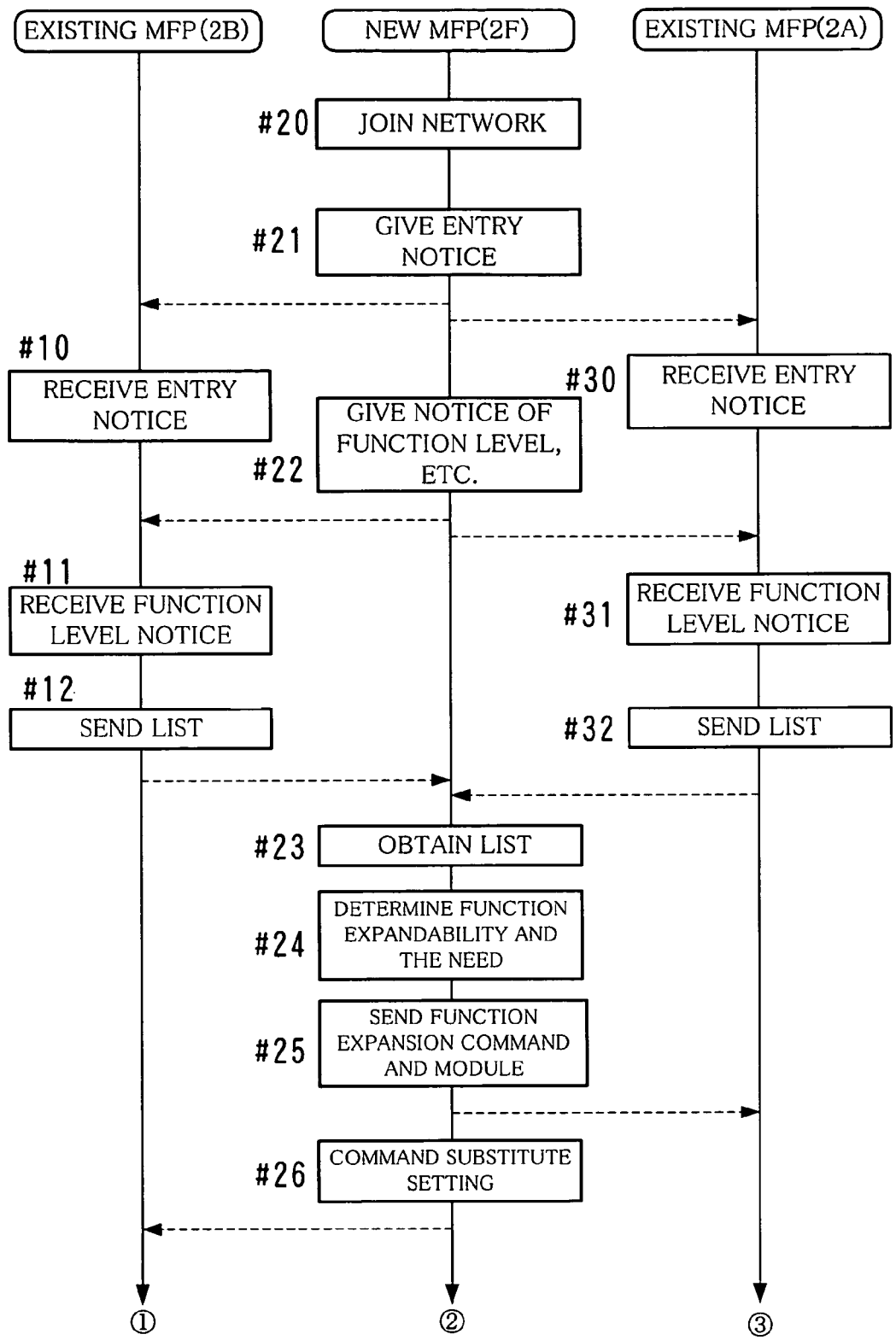
FIG. 16 is a flowchart showing an example of a flow of the entire process in each image forming apparatus.
Figure 17:
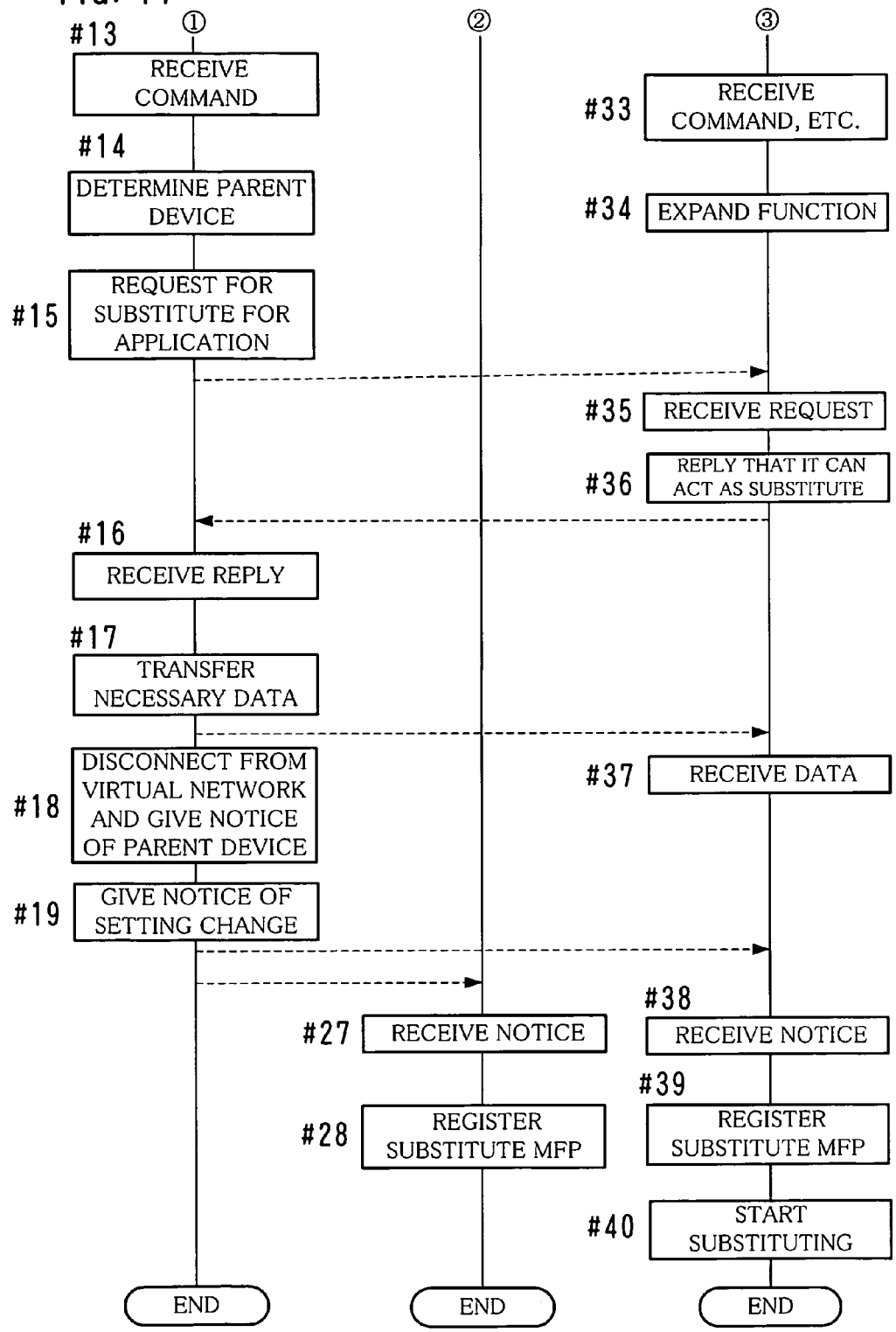
FIG. 17 is a flowchart showing an example of a flow of the entire process in each image forming apparatus.

FIGS. 16 and 17 are flowcharts respectively showing an example of a flow of the entire process in each of the image forming apparatuses 2.

Next, descriptions are provided, with reference to the flowcharts, of a process flow in an image forming apparatus 2 that will participate in an existing virtual network and of a process flow in an image forming apparatus 2 that already participates in the virtual network. Here, descriptions are given of an example of the image forming apparatus 2F that will join and of the image forming apparatuses 2A and 2B that already join.

Referring to FIG. 16, when the image forming apparatus 2F completes preparations for joining a virtual network (#20), it transmits device attribution information 71 for the image forming apparatus 2F itself and other information along with entry notification to other image forming apparatuses 2 that already participate in the image processing system 1 (#21 and #22).

When receiving them (#10 and #11), the image forming apparatus 2A transmits to the image forming apparatus 2F as an MFP that newly joins device attribution information 71, application module list information 74 and service module list information 75 for the image forming apparatus 2A itself (#12). The image forming apparatus 2B also performs the same process (#30 through #32).

When receiving these pieces of information from the image forming apparatuses 2A and 2B (#23), the image forming apparatus 2F detects participation of the image forming apparatuses 2A and 2B in the identical virtual network. Then, the image forming apparatus 2F determines the presence of a function to be added with respect to each of the image forming apparatuses 2A and 2B, whether the function is applicable and a module necessary for performing a function expansion process (#24). As a result, in this example, suppose that a determination is made in which the image forming apparatus 2A has a function to be expanded and the function is applicable and a determination is made in which the image forming apparatus 2B has a function to be expanded but the function is not applicable.

Then, the image forming apparatus 2F instructs the image forming apparatus 2A to perform a process for expanding the function and transmits to the same an application module MA and a service module MS that are necessary for the function expansion process (#25). In addition, the image forming apparatus 2F instructs the image forming apparatus 2B to perform a setting process for making another image forming apparatus 2 execute a process of the corresponding function (#26).

When receiving the instructions and the modules from the image forming apparatus 2F (#33 in FIG. 17), the image forming apparatus 2A installs the modules or the like to perform a process for expanding the function (#34).

In contrast, when receiving the instructions from the image forming apparatus 2F (#13), the image forming apparatus 2B searches another image forming apparatus 2 to which the function to be expanded this time is already applied and selects the searched image forming apparatus 2 as a parent device (#14). In this example, suppose that the image forming apparatus 2A is determined to be a parent device. Then, the image forming apparatus 2B requests the image forming apparatus 2A to act as a parent device of the image forming apparatus 2B (#15).

In response to the request from the image forming apparatus 2B (#35), the image forming apparatus 2A determines whether or not it can act as a substitute. If the image forming apparatus 2A can act as a substitute, it notifies the image forming apparatus 2B accordingly (#36).

When receiving the notification indicating that the image forming apparatus 2A can act as a substitute from the same (#16), the image forming apparatus 2B transfers to the image forming apparatus 2A data that are necessary for the image forming apparatus 2A to act as a substitute (#17). The image forming apparatus 2B changes a virtual network name of local device attribution information 71 to leave the virtual network that the image forming apparatus 2B currently joins (#18). After that, the image forming apparatus 2B notifies each of the image forming apparatuses 2 of identification information of the set parent device, e.g., an IP address thereof, and a message indicating that the image forming apparatus 2B left the virtual network (#19).

When receiving the notification from the image forming apparatus 2B (#38 and #27), each of the image forming apparatuses 2A and 2F registers in the local device attribution information 71 of its own the image forming apparatus 2A as the parent device of the image forming apparatus 2B (#39 and #28). Then, the image forming apparatus 2A starts to act for the image forming apparatus 2B (#40). It should be noted that the image forming apparatus 2A does not perform the processes indicated in Steps #35 through #37 and #40 if the image forming apparatus 2B sets, as a parent device, an image forming apparatus 2 other than the image forming apparatus 2A.

The other image forming apparatuses 2 (2C-2E) also perform a process similar to Steps #10 through #19 or Steps #30 through #40 respectively in accordance with function expansion permission.

By the processes discussed above, the image forming apparatus 2F is added to a virtual network and functions of the existing image forming apparatuses 2 are expanded in conformity with the function of the image forming apparatus 2F. In addition, with respect to an image forming apparatus 2 where a function cannot be expanded, an image forming apparatus 2 where the function can be expanded, e.g., the image forming apparatus 2A is set as a parent device, making possible indirect entry into the virtual network.

Figure 18:
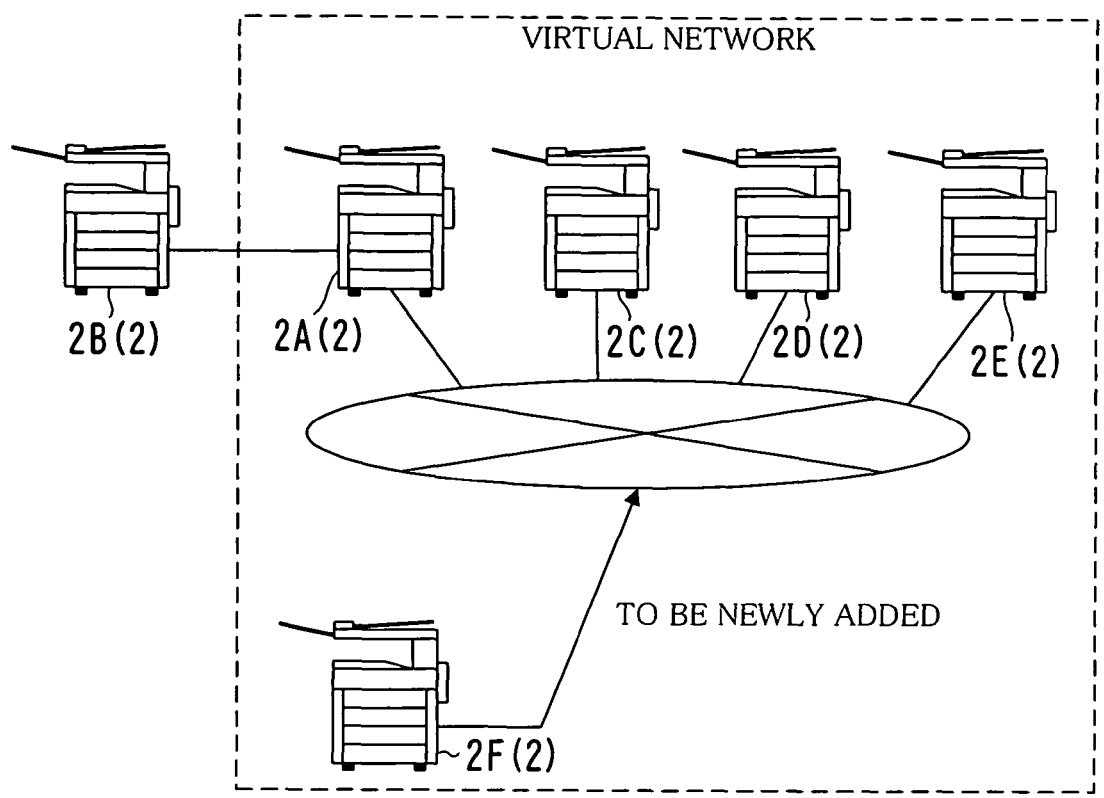
FIG. 18 is a diagram showing an example of a configuration of a virtual network.
Figure 19:
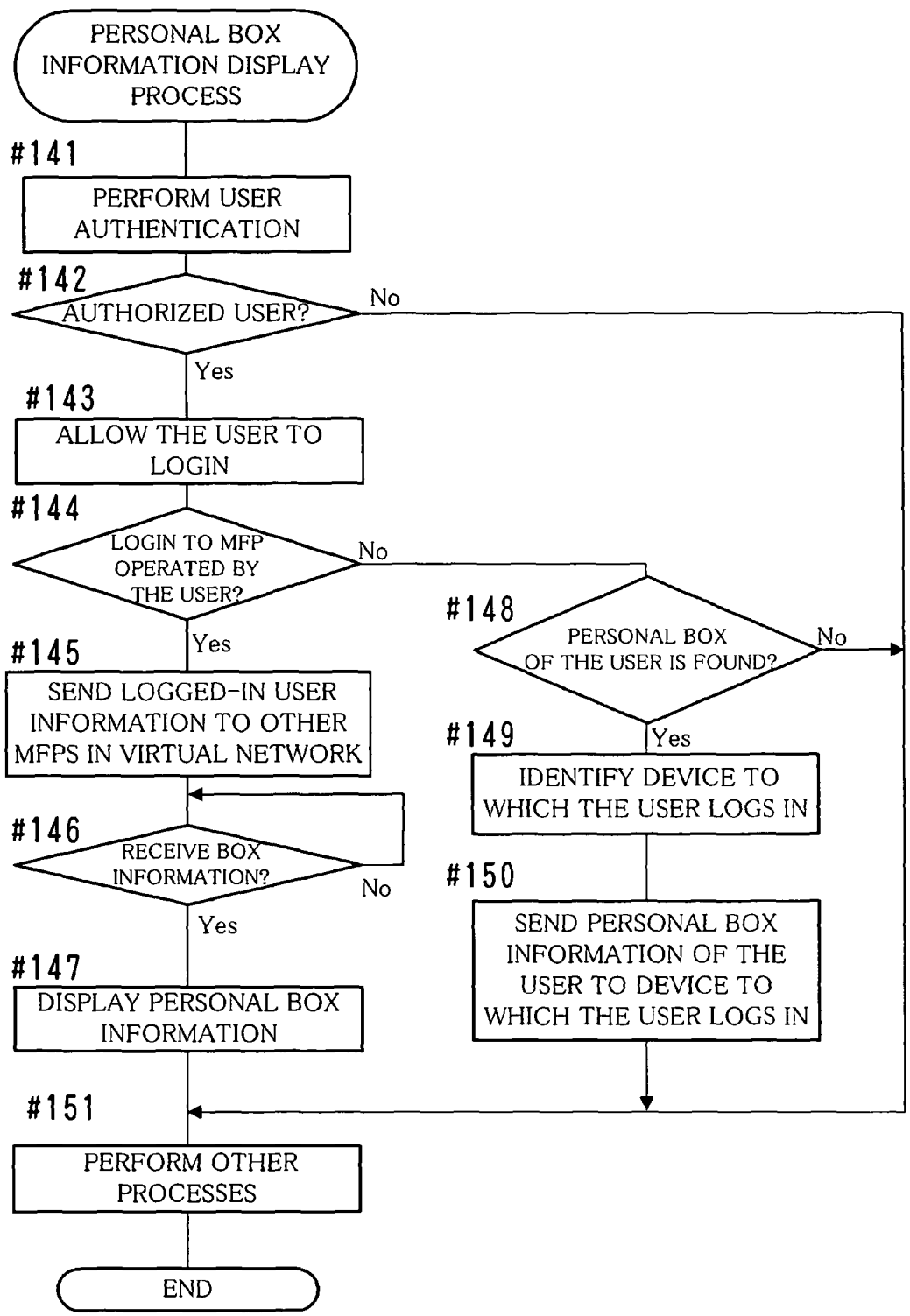
FIG. 19 is a flowchart showing an example of a flow of a personal box information displaying process.
Figure 20:
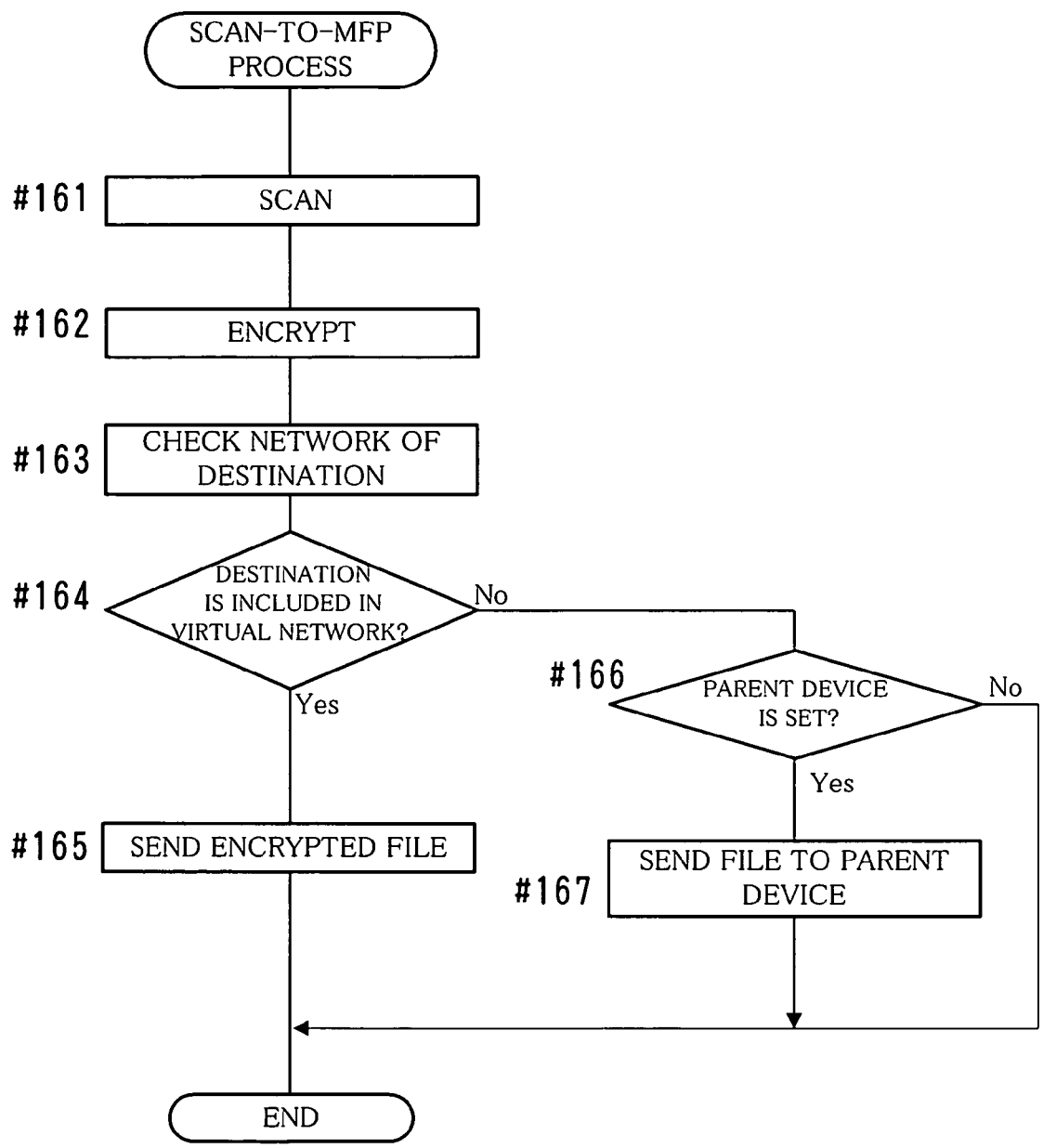
FIG. 20 is a flowchart showing an example of a flow of a scan-to-MFP process.

FIG. 18 is a diagram showing an example of a configuration of a virtual network, FIG. 19 is a flowchart showing an example of a flow of a personal box information displaying process and FIG. 20 is a flowchart showing an example of a flow of a scan-to-MFP process.

As described above, an image forming apparatus 2 that newly joins a virtual network and an image forming apparatus 2 that performed a function expansion process in conformity with the function of the newly-joined image forming apparatus 2 can perform various processes in corporation with each other using application modules MA. Further, an image forming apparatus 2 that leaves the virtual network due to inapplicability of the function expansion process and sets a parent device can perform various processes in corporation with image forming apparatuses 2 in the virtual network through the parent device. Hereinafter, referring to FIG. 18, descriptions are given of an example of a cooperative process in the case where the image forming apparatus 2F newly participates in a virtual network, the image forming apparatuses 2A, 2C, 2D and 2E respectively complete a function expansion process in conformity with the function of the image forming apparatus 2F and the image forming apparatus 2B sets the image forming apparatus 2A as a parent device and leaves the virtual network.

For example, suppose that the respective image forming apparatuses 2A, 2C, 2D and 2E are newly provided with a function (an application module MA) of sharing a personal box PB among the image forming apparatuses 2 in the identical virtual network after the image forming apparatuses 2A, 2C, 2D and 2E respectively expand a function in conformity with the function of the image forming apparatus 2F. In such a case, each of the image forming apparatuses 2A, 2C, 2D, 2E and 2F performs a process for displaying information on the personal box PB in the procedure as shown in FIG. 19. Here, an example is described in which the image forming apparatus 2C performs the process.

A user who mainly uses the image forming apparatus 2C can login to the image forming apparatus 2C to use his/her personal box PB and also can login to other image forming apparatus 2 to use his/her personal box PB. In order to login, the user is required to enter his/her user name and password and to be authenticated by the image forming apparatus 2C.

The image forming apparatus 2C performs a user authentication process based on the user name and the password that are entered by the user in the image forming apparatus 2C or other image forming apparatus 2 and user information 72 for the user (#141). More specifically, the image forming apparatus 2C calls the user information 72 corresponding to the user name and compares the entered password and a password indicated in the user information 72 to check whether or not the user is an authorized user.

When the image forming apparatus 2C verifies the authenticity of the user (Yes in #142), it allows the user to login (#143).

When the user logs in to the image forming apparatus 2C (Yes in #144), the image forming apparatus 2C transmits the user information 72 of the user to request the image forming apparatuses 2A, 2D, 2E and 2F and requests them to send information on a personal box PB of the user (#145).

In the case where the image forming apparatuses 2A, 2D, 2E and 2F store the personal box PB of the user in the respective personal box storage areas RYB, they respectively transmit to the image forming apparatus 2C information on the personal box PB, e.g., a size thereof and a list of files stored therein.

When receiving the information on the personal box PB (Yes in #146), the image forming apparatus 2C displays the information on the control panel 20f (#147).

In Step #145, the image forming apparatus 2C requests the image forming apparatus 2A, which is the parent device of the image forming apparatus 2B, to transmit to the image forming apparatus 2C information on the personal box PB of the user that is stored on the image forming apparatus 2B. Responding to this, the image forming apparatus 2A inquires of the image forming apparatus 2B as to whether or not the personal box PB of the user is stored therein. If it is stored, the image forming apparatus 2A obtains information on the personal box PB from the image forming apparatus 2B to transfer the same to the image forming apparatus 2C. In other words, the image forming apparatus 2A relays information. When receiving the information, the image forming apparatus 2C displays the information on the control panel 20f (Yes in #146 and #147).

In contrast, in the case where the user logs in to any one of the image forming apparatuses 2A, 2D, 2E and 2F (No in #144), if the image forming apparatus 2C stores the personal box PB of the user (Yes in #148), the image forming apparatus 2C identifies the image forming apparatus 2 to which the user logs in (#149). After that, the image forming apparatus 2C transmits the information on the personal box PB to the image forming apparatus 2 thus identified (#150). The image forming apparatus 2 that received the information displays the same on the control panel 20f.

When the user logs in to the image forming apparatus 2B, the information on the personal box PB is transmitted to the image forming apparatus 2A as the parent device thereof in Step #150. In such a case, the image forming apparatus 2A relays the information to the image forming apparatus 2B.

The user can use a file in his/her personal box PB with viewing the information of the personal box PB that is displayed in this manner.

In other case, suppose that the image forming apparatuses 2A, 2C, 2D and 2E are respectively provided with a function (an application module MA) of encrypting a file to transmit the encrypted file to other image forming apparatus 2 after the image forming apparatuses 2A, 2C, 2D and 2E respectively perform a function expansion process in conformity with the function of the image forming apparatus 2F. In such a case, each of the image forming apparatuses 2A, 2C, 2D, 2E and 2F performs a file transmission process in the procedure as shown in FIG. 20. Here, an example is described in which the image forming apparatus 2C scans an original to transmit to other image forming apparatus 2 an image file obtained by scanning the original.

When the image forming apparatus 2C scans an original to generate an image file (#161), it encrypts the image file using its own private key (#162). The image forming apparatus 2C checks, based on device list information 76 (see FIG. 15), a network of an image forming apparatus 2 that is designated as a destination by a user (#163).

When the image forming apparatus 2 that is designated as a destination participates in the same virtual network as the image forming apparatus 2C (Yes in #164), the encrypted image file is transmitted to the image forming apparatus 2 designated as a destination (#165). When the image forming apparatus 2 as a destination does not participate in the same virtual network as the image forming apparatus 2C and a parent device is set (No in #164 and Yes in #166), the encrypted image file is transmitted to the parent device (#167). When the image forming apparatus 2 as a destination does not participate in the same virtual network as the image forming apparatus 2C and no parent device is set (No in #166), transmission of an image file is stopped.

The image forming apparatus 2 that received the encrypted image file uses a public key of the image forming apparatus 2C to decode the image file. In the case where the image file is decoded properly, it is proved that the image file originates from the image forming apparatus 2C.

In the case of encrypted communication to prevent leakage of confidential information, the image forming apparatus 2C may encrypt an image file using a public key of an image forming apparatus 2 at the other end or using a common key that is owned only by the both parties. Alternatively, encrypted communication such as SSL (Secure Sockets Layer) is also possible.

The present embodiment enables existing image forming apparatuses 2 to be provided with a new function that resides in an image forming apparatus 2 newly added to the image processing system 1. Accordingly, the new function can be utilized more effectively than conventional methods and systems. Further, image forming apparatuses 2 that have been provided with a new function form one virtual network and image forming apparatuses 2 that cannot be provided with the same are made to leave the virtual network. Thereby, when the function is one concerning security protection, safety communication can be realized without lowering a security level in the entire virtual network.

Figure 21:
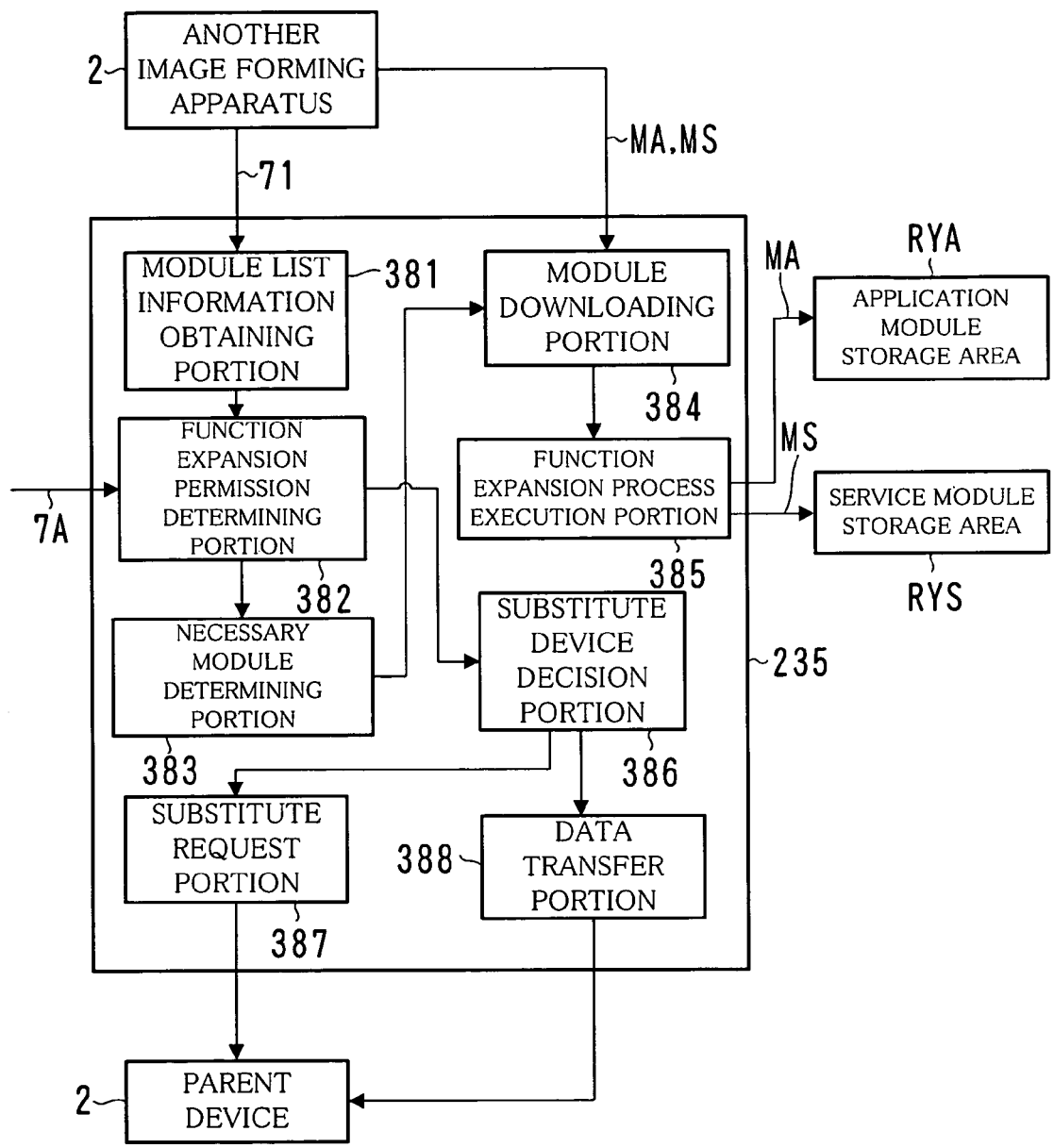
FIG. 21 is a diagram showing a modified example of the configuration of the function expansion process portion.

FIG. 21 is a diagram showing a modified example of the configuration of the function expansion process portion 235. In this embodiment, functions of existing image forming apparatuses 2 (e.g., the image forming apparatuses 2A-2E shown in FIG. 18) are checked based on an image forming apparatus 2 (e.g., the image forming apparatus 2F shown in FIG. 18) that newly joins the image processing system 1 and a module for expanding a function is distributed if needed. Instead, a configuration is possible in which functions of the existing image forming apparatuses 2 are checked based on the existing image forming apparatuses 2 themselves and they obtain a module necessary to expand a function. More specifically, the function expansion process portion 235 of the image forming apparatus 2 shown in FIG. 3 may be made up of a module list information obtaining portion 381, a function expansion permission determining portion 382, a necessary module determining portion 383, a module downloading portion 384, a function expansion process execution portion 385, a substitute device decision portion 386, a substitute request portion 387 and a data transfer portion 388 as shown in FIG. 21.

Referring to FIG. 21, the module list information obtaining portion 381 obtains application module list information 74 for another image forming apparatus 2 that newly joins the image processing system 1 from the other image forming apparatus 2.

The function expansion permission determining portion 382 compares the application module list information 74 thus obtained with application module list information 74 of the image forming apparatus 2 including the function expansion permission determining portion 382 to determine a function (an application module MA) that resides in the other image forming apparatus 2 that newly joins but does not reside in the image forming apparatus 2 itself. Then, the function expansion permission determining portion 382 determines whether or not the application module MA is applicable to the image forming apparatus 2 itself based on application module attribution information 7A (see FIG. 6) of the application module MA and device attribution information 71 (see FIG. 7) for the image forming apparatus 2 itself. In other words, it is determined whether or not the image forming apparatus 2 itself satisfies hardware outlines specified in the application module attribution information 7A.

The necessary module determining portion 383 determines a service module MS that does not reside in the image forming apparatus 2 itself among service modules MS necessary to execute the application module MA that is determined to be applicable based on the application module attribution information 7A of the application module MA and service module list information 75 for the image forming apparatus 2 itself. In short, the necessary module determining portion 383 determines a service module to be added.

The module downloading portion 384 downloads from the other image forming apparatus 2 that newly joins the application module MA that is determined to be applicable by the function expansion permission determining portion 382 and a service module MS that should be added in order to execute the application module MA.

The function expansion process execution portion 385 installs the application module MA and the service module MS thus downloaded on the application module storage area RYA and the service module storage area RYS (see FIG. 4) respectively to perform a function expansion process.

If an application module MA exists that is determined to be inapplicable by the function expansion permission determining portion 382, the substitute device decision portion 386 determines another image forming apparatus 2 suitable as an apparatus that performs a process regarding this application module MA as a substitute. In short, the substitute device decision portion 386 determines a parent device. A method for determining a parent device is as described earlier with reference to the substitute device decision portion 313 shown in FIG. 12.

The substitute request portion 387 requests a determined parent device to perform a process as a substitute, similar to the case of the substitute request portion 314 shown in FIG. 12. The data transfer portion 388 transfers data necessary for substitute to the parent device, similar to the case of the data transfer portion 315.

In the present embodiment, a configuration is exemplified in which an application module MA and a service module MS are directly transmitted from an image forming apparatus 2 that newly joins to existing image forming apparatuses 2. In this configuration, however, when specifications are different between the image forming apparatus 2 that newly joins and the existing image forming apparatuses 2, the possibility arises that the existing image forming apparatuses 2 can not apply the received application module MA or the received service module MS to themselves. In order to avoid such a situation, the image forming apparatus 2 that newly joins may notify the existing image forming apparatuses 2 of identification information (a module name or the like, for example) of an application module MA and a service module MS. The existing image forming apparatuses 2 may gain access to a website of a manufacturer or a software company based on the notification to obtain an application module MA or a service module MS corresponding to themselves.

Furthermore, the configuration of the entire or a part of the image processing system 1 and the image forming apparatus 2, the process contents, the process procedure and the like can be modified in accordance with the spirit of the present invention if necessary.

The present invention can be suitably used to configure one system or one network using plural image forming apparatuses.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus having a function of exchanging data via a communication line, the image forming apparatus comprising:
 a function information obtaining portion for obtaining function information on a function that resides in another image forming apparatus when the image forming apparatus is connected to the other image forming apparatus via the communication line;

a function presence determining portion for determining whether or not the other image forming apparatus has a predetermined function that resides in the image forming apparatus based on the function information of the other image forming apparatus, the function information being obtained by the function information obtaining portion; and a function expansion commanding portion for instructing the other image forming apparatus to perform a function expansion process to install an application module that supports the predetermined function in the other image forming apparatus when the function presence determining portion determines that the other image forming apparatus does not have the predetermined function.

2. The image forming apparatus according to claim 1, further comprising a data exchange control portion for allowing the image forming apparatus to exchange predetermined data using the predetermined function with the other image forming apparatus having the predetermined function and for forbidding the image forming apparatus to exchange the predetermined data with the other image forming apparatus without the predetermined function.

3. The image forming apparatus according to claim 1, further comprising a module transmission portion for transmitting to the other image forming apparatus a module that is necessary to provide the other image forming apparatus with the predetermined function when the function presence determining portion determines that the other image forming apparatus does not have the predetermined function.

4. An image forming apparatus having a function of exchanging data via a communication line, the image forming apparatus comprising:

a function information obtaining portion for obtaining function information on a function that resides in another image forming apparatus when the image forming apparatus is connected to the other image forming apparatus via the communication line;

a function presence determining portion for determining whether or not the image forming apparatus has a predetermined function that resides in the other image forming apparatus based on the function information of the other image forming apparatus, the function information being obtained by the function information obtaining portion; and a function expansion process portion for performing a function expansion process to install an application module that supports the predetermined function in the image forming apparatus when the function presence determining portion determines that the image forming apparatus does not have the predetermined function.

5. An image forming apparatus having a function of exchanging data via a communication line, the image forming apparatus comprising:

a function information obtaining portion for obtaining function information on a function that resides in another image forming apparatus when the image forming apparatus is connected to the other image forming apparatus via the communication line;

a function presence determining portion for determining whether or not the other image forming apparatus has a predetermined function that resides in the image forming apparatus based on the function information of the other image forming apparatus, the function information being obtained by the function information obtaining portion; and a function expansion commanding portion for instructing the other image forming apparatus to perform a function expansion process to provide the other image forming apparatus with the predetermined function when the function presence determining portion determines that the other image forming apparatus does not have the predetermined function;

wherein the predetermined function is a function for encrypting and decoding the predetermined data, and the predetermined data are data including confidential information.

6. An image processing system including plural image forming apparatuses each of which has a function of exchanging data via a communication line, the system comprising:

a function difference determining portion for determining a difference between a function of the image forming apparatus that is newly added to the image processing system and a function of the existing image forming apparatus; and a function expansion process portion for letting the image forming apparatus perform a process to install an application module that supports a predetermined function in the image forming apparatus, the image forming apparatus being determined not to have the predetermined function by the function difference determining portion.

7. The image processing system according to claim 6, further comprising a virtual network forming portion for forming a virtual network by the image forming apparatuses that have the predetermined function.

8. A method for expanding a function of an image forming apparatus, the method comprising:

when a first image forming apparatus and a second image forming apparatus are interconnected, determining whether or not the second image forming apparatus has a predetermined function that resides in the first image forming apparatus; and performing a function expansion process for installing an application module that supports the predetermined function in the second image forming apparatus when the second image forming apparatus does not have the predetermined function.

9. A method for forming a virtual network, comprising:

when a first image forming apparatus is connected to a system including one or more second image forming apparatuses, determining whether or not each of the second image forming apparatuses has a predetermined function that resides in the first image forming apparatus;

performing a function expansion process, when any of the second image forming apparatuses does not have the predetermined function, for installing an application module that supports the predetermined function in the second image forming apparatus; and forming the virtual network for exchanging predetermined data by using the first image forming apparatus and the second image forming apparatus having the predetermined function.

10. The method according to claim 9, further comprising, when there is the second image forming apparatus that is incapable of having the predetermined function, letting any of the other second image forming apparatuses having the predetermined function or the first image forming apparatus perform a process using the predetermined function instead of the second image forming apparatus that is incapable of having the predetermined function.

11. An image processing system including plural image forming apparatuses, at least one of the plural image forming apparatuses having a function of exchanging data via a communication line, and at least one of the plural image forming apparatuses comprising:

- a function information obtaining portion for obtaining function information on a function that resides in another image forming apparatus when the image forming apparatus is connected to the other image forming apparatus via the communication line;
- a function presence determining portion for determining whether or not the other image forming apparatus has a predetermined function that resides in the image forming apparatus based on the function information of the other image forming apparatus, the function information being obtained by the function information obtaining portion; and
- a function expansion commanding portion for instructing the other image forming apparatus to perform a function expansion process to provide the other image forming apparatus with the predetermined function when the function presence determining portion determines that the other image forming apparatus does not have the predetermined function;
- wherein the predetermined function is a function for encrypting and decoding the predetermined data, and the predetermined data are data including confidential information.

12. A method for expanding a function of an image forming apparatus, the method comprising:

- obtaining, by an image forming apparatus, function information on a function that resides in another image forming apparatus when the image forming apparatus is connected to the other image forming apparatus via the communication line;
- determining, by the image forming apparatus, whether or not the other image forming apparatus has a predetermined function that resides in the image forming apparatus based on the function information of the other image forming apparatus, the function information being obtained during the obtaining step; and
- instructing the other image forming apparatus, by the image forming apparatus, to perform a function expansion process to provide the other image forming apparatus with the predetermined function when it is determined that the other image forming apparatus does not have the predetermined function;
- wherein the predetermined function is a function for encrypting and decoding the predetermined data, and the predetermined data are data including confidential information.

13. An image forming apparatus having a function of exchanging data via a communication line, the image forming apparatus comprising:

- a function information obtaining portion for obtaining function information on a function that resides in another image forming apparatus when the image forming apparatus is connected to the other image forming apparatus via the communication line;
- a function presence determining portion for determining whether or not the image forming apparatus has a predetermined function that resides in the other image forming apparatus based on the function information of the other image forming apparatus, the function information being obtained by the function information obtaining portion; and
- a function expansion process portion for performing a function expansion process to provide the image forming apparatus with the predetermined function when the function presence determining portion determines that the image forming apparatus does not have the predetermined function;
- wherein the predetermined function is a function for encrypting and decoding the predetermined data, and the predetermined data are data including confidential information.

* * * * *